United States Patent
Curley

(10) Patent No.: US 11,117,741 B2
(45) Date of Patent: *Sep. 14, 2021

(54) OBJECT HANDLING DEVICE AND METHOD

(71) Applicant: Mark D. Curley, Tampa, FL (US)

(72) Inventor: Mark D. Curley, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,352

(22) Filed: Jan. 14, 2020

(65) Prior Publication Data

US 2020/0148469 A1 May 14, 2020

Related U.S. Application Data

(60) Continuation-in-part of application No. 16/398,814, filed on Apr. 30, 2019, now Pat. No. 10,850,657,
(Continued)

(51) Int. Cl.
| | |
|---|---|
| *B65F 3/00* | (2006.01) |
| *B60P 1/64* | (2006.01) |
| *B60P 1/02* | (2006.01) |
| *B60P 1/34* | (2006.01) |
| *B66D 1/00* | (2006.01) |

(Continued)

(52) U.S. Cl.
CPC ................... *B65F 3/00* (2013.01); *B60P 1/02* (2013.01); *B60P 1/34* (2013.01); *B60P 1/6427* (2013.01); *B60P 1/6454* (2013.01); *B60P 1/6481* (2013.01); *B60P 1/165* (2013.01); *B60P 1/36* (2013.01); *B60P 1/431* (2013.01); *B65F 3/001* (2013.01); *B65F 2003/008* (2013.01); *B66D 1/00* (2013.01); *B66F 7/065* (2013.01)

(58) Field of Classification Search
CPC .. B60P 1/02; B60P 1/34; B60P 1/6427; B60P 1/6454; B60P 1/6463; B60P 1/6481; B60P 3/08; B65F 3/00; B65F 2003/008
USPC ....... 414/477, 478, 480, 486, 491, 494, 501, 414/679
See application file for complete search history.

(56) References Cited

U.S. PATENT DOCUMENTS

| | | | |
|---|---|---|---|
| 1,573,172 A | * | 2/1926 | Laffey ...................... B60P 1/02 414/349 |
| 2,953,410 A | | 9/1960 | Chaney |

(Continued)

FOREIGN PATENT DOCUMENTS

| | | | | |
|---|---|---|---|---|
| FR | 2641743 A1 | * | 7/1990 | ............ B60P 1/6454 |
| WO | WO 2007092613 A2 | | 8/2007 | |

*Primary Examiner* — James Keenan
(74) *Attorney, Agent, or Firm* — Frijouf, Rust & Pyle, P.A.

(57) ABSTRACT

An object handling device handles a first object and a second object. A lower support beam, a first side frame and a second side frame define a lower object holding channel for supporting the first object. A first upper support beam and a second upper support beam define an upper object holding channel. An object lift vertically lifts the first object from the lower object holding channel to the upper object holding channel. A beam lift pivots the lower support beam and the first object. A lower hoist positions a second object within the lower object holding channel. A first telescoping support beam and a second telescoping support beam define an angled object displacement channel. An upper hoist links with the first object for displacing the first object along the angled object displacement channel.

15 Claims, 37 Drawing Sheets

Related U.S. Application Data which is a division of application No. 15/483,609, filed on Apr. 10, 2017, now Pat. No. 10,322,874.

(60) Provisional application No. 62/322,205, filed on Apr. 13, 2016.

(51) Int. Cl.
   *B66F 7/06* (2006.01)
   *B60P 1/43* (2006.01)
   *B60P 1/36* (2006.01)
   *B60P 1/16* (2006.01)

(56) References Cited

U.S. PATENT DOCUMENTS

| | | | |
|---|---|---|---|
| 3,049,378 A | 8/1962 | Nelson | |
| 3,202,305 A | 8/1965 | Dempster et al. | |
| 3,362,552 A | 1/1968 | Thiele | |
| 3,499,562 A | 3/1970 | Phillips | |
| 3,612,315 A | 10/1971 | Blackburn | |
| 3,998,491 A * | 12/1976 | Diem | B60P 1/34 298/11 |
| 4,005,784 A | 2/1977 | Wilson | |
| 4,133,439 A | 1/1979 | Goranson | |
| 4,165,007 A | 8/1979 | Brown | |
| 4,221,536 A * | 9/1980 | McFee | B60P 3/06 104/172.2 |
| 4,232,986 A * | 11/1980 | Johnson | A01D 90/083 414/24.5 |
| 4,278,390 A | 7/1981 | Ahearn | |
| 4,325,666 A | 4/1982 | Chain et al. | |
| 4,529,349 A | 7/1985 | Lutz | |
| 4,599,040 A | 7/1986 | Rasmussen | |
| 4,645,405 A | 2/1987 | Cambiano | |
| 4,934,898 A | 6/1990 | Galbreath | |
| 4,954,039 A | 9/1990 | Johnston et al. | |
| 4,986,719 A | 1/1991 | Galbreath | |
| 5,100,279 A | 3/1992 | Bjerk | |
| 5,183,371 A | 2/1993 | O'Daniel | |
| 5,203,668 A | 4/1993 | Marmur | |
| 5,246,330 A * | 9/1993 | Marmur | B60P 1/6454 280/789 |
| 5,401,137 A * | 3/1995 | Nijenhuis | B65F 3/00 414/679 |
| 5,417,540 A | 5/1995 | Cox | |
| 5,460,473 A | 10/1995 | LaMora et al. | |
| 5,630,694 A | 5/1997 | Ihara | |
| 5,678,978 A | 10/1997 | Markham | |
| 5,743,701 A | 4/1998 | Green | |
| 5,829,946 A | 11/1998 | McNeilus et al. | |
| 5,915,913 A * | 6/1999 | Greenlaw | B60P 1/02 414/679 |
| 6,155,769 A | 12/2000 | Robinson | |
| 6,354,787 B1 | 3/2002 | O'Daniel | |
| 6,368,034 B1 * | 4/2002 | Frye | B60P 3/08 410/14 |
| 6,485,237 B1 * | 11/2002 | Sandwith | B60P 3/08 410/24 |
| 6,705,823 B2 | 3/2004 | Bohata | |
| 7,112,030 B2 | 9/2006 | Renziehausen | |
| 7,172,378 B1 | 2/2007 | Cerullo et al. | |
| 7,695,237 B2 | 4/2010 | Shirvanian | |
| 7,883,310 B2 | 2/2011 | McGraw | |
| 8,226,343 B2 | 7/2012 | Weeks et al. | |
| 8,444,365 B2 | 5/2013 | Duell et al. | |
| 8,932,000 B2 | 1/2015 | Poulsen et al. | |
| 8,961,097 B2 * | 2/2015 | Doron | B60P 1/6454 414/482 |
| 9,340,138 B2 * | 5/2016 | Piekny | B60P 1/34 |
| 2006/0062659 A1 | 3/2006 | Marmur et al. | |
| 2006/0062660 A1 | 3/2006 | Marmur et al. | |
| 2009/0263221 A1 | 10/2009 | Oldershaw | |
| 2012/0242051 A1 | 9/2012 | Lacasse | |
| 2014/0356110 A1 | 12/2014 | Rawdon et al. | |
| 2015/0232134 A1 * | 8/2015 | Lavmand | B62D 33/08 414/679 |

\* cited by examiner

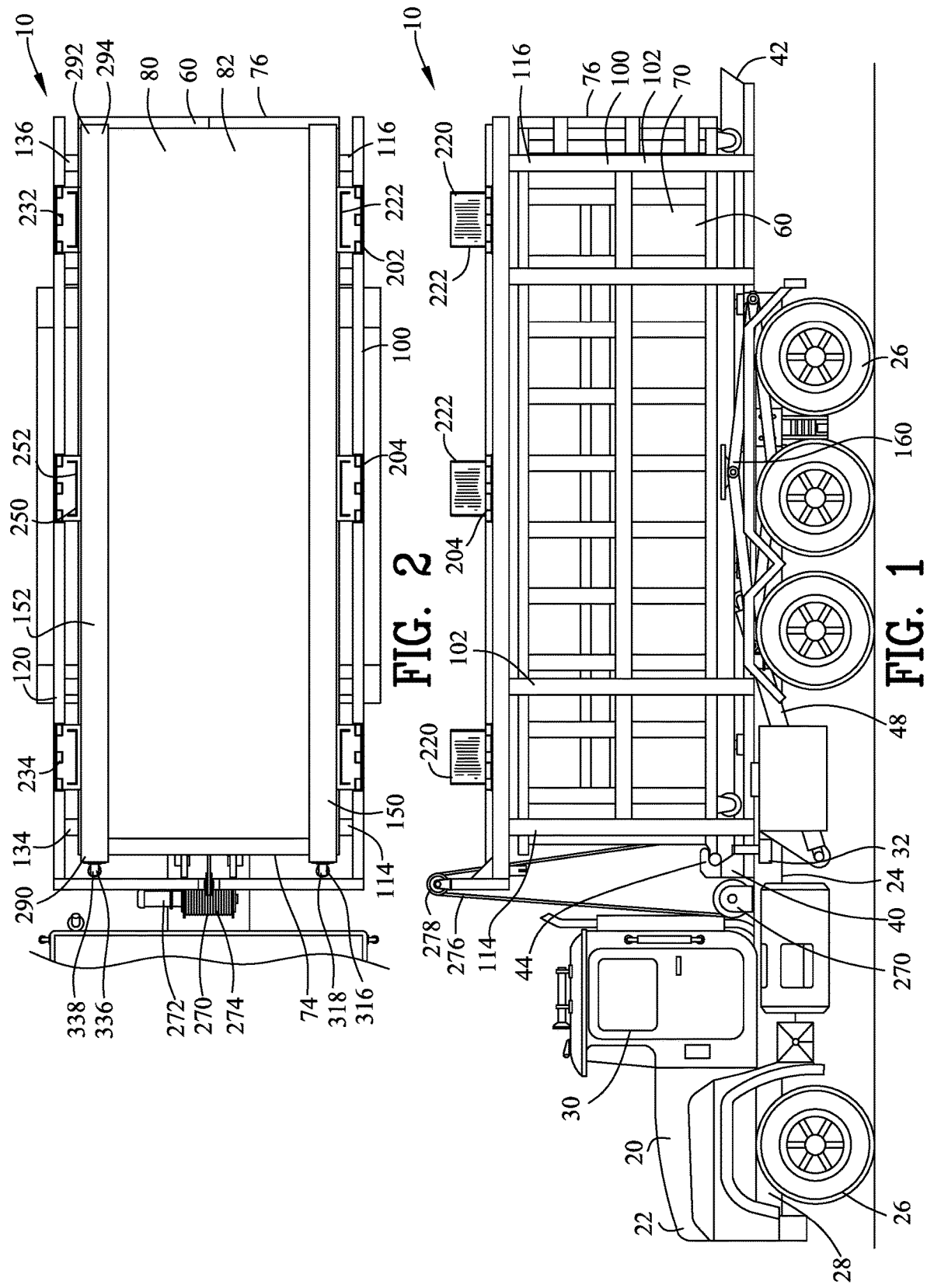

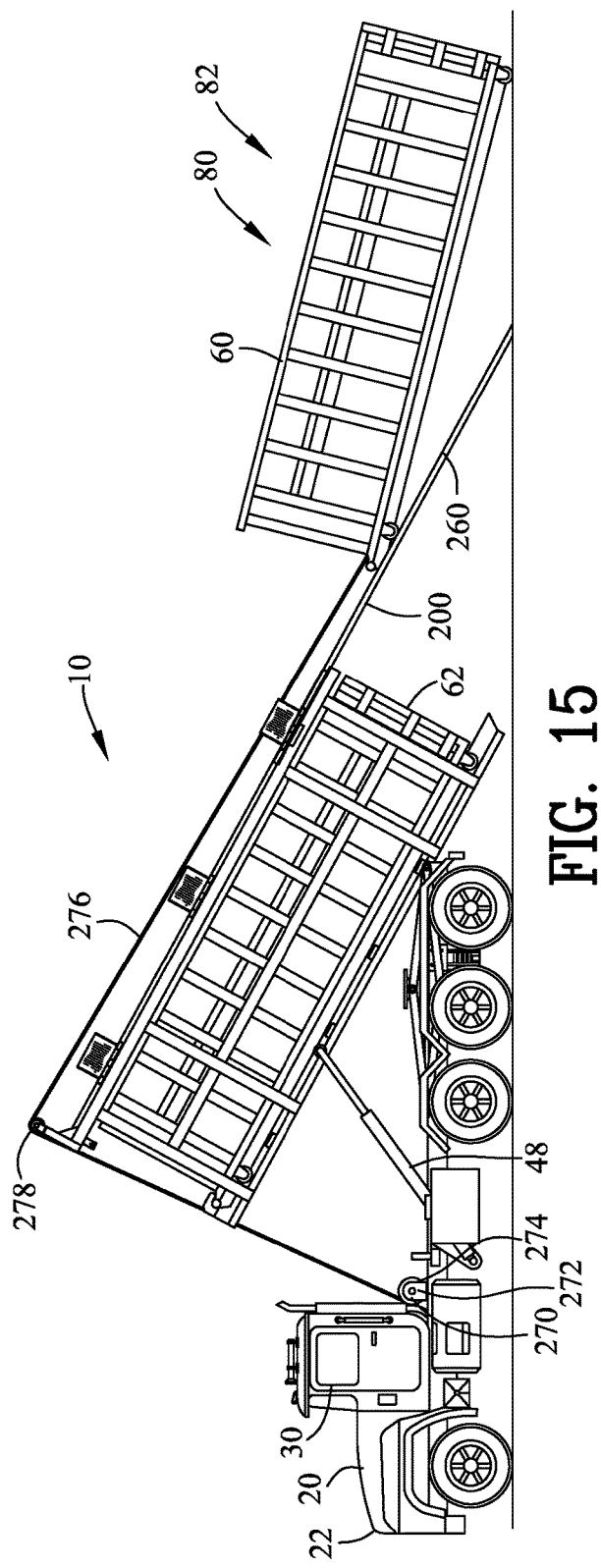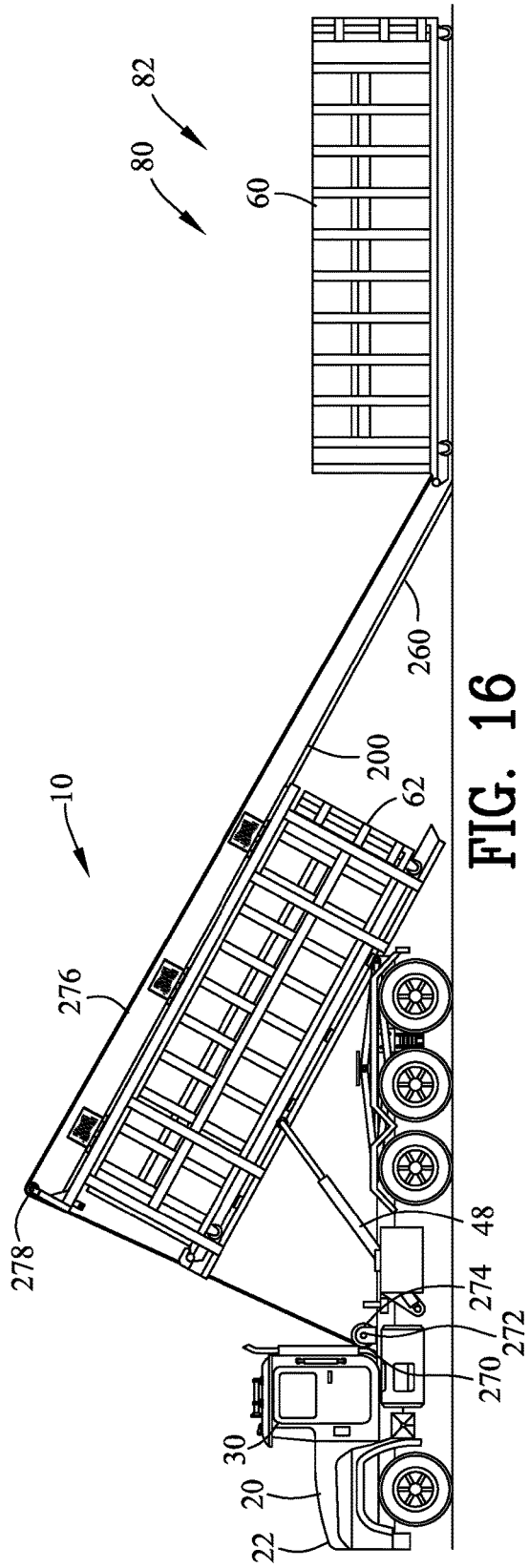

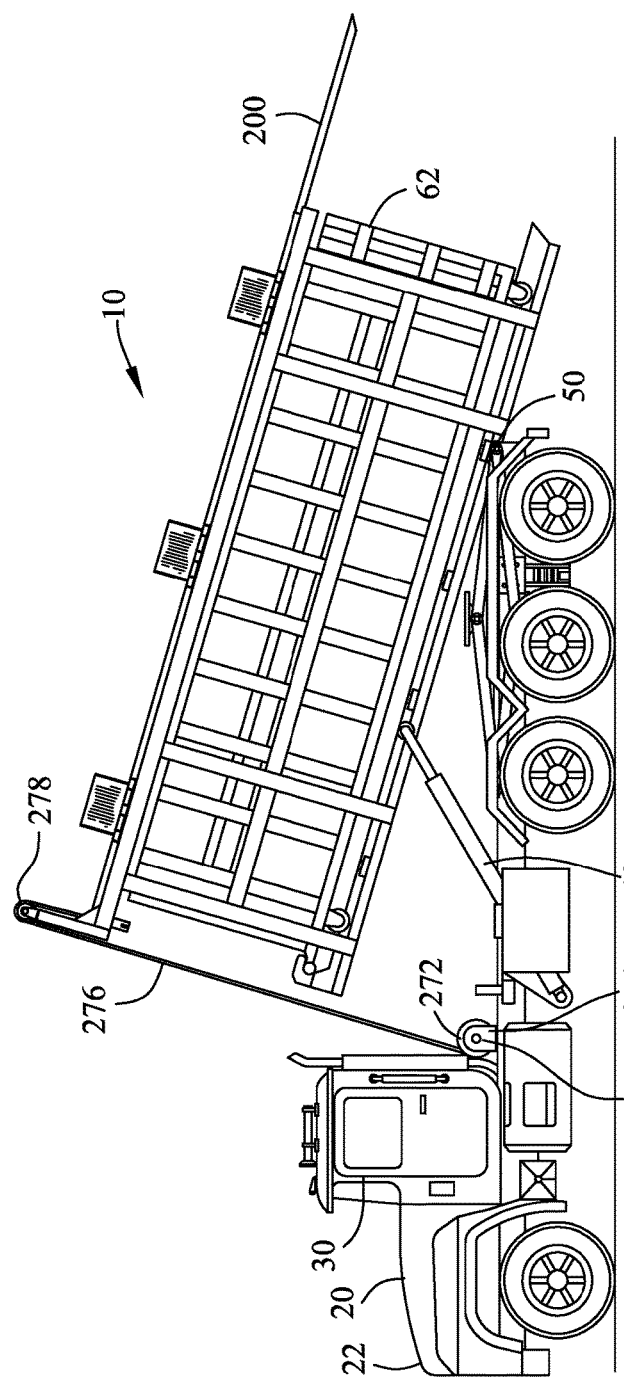
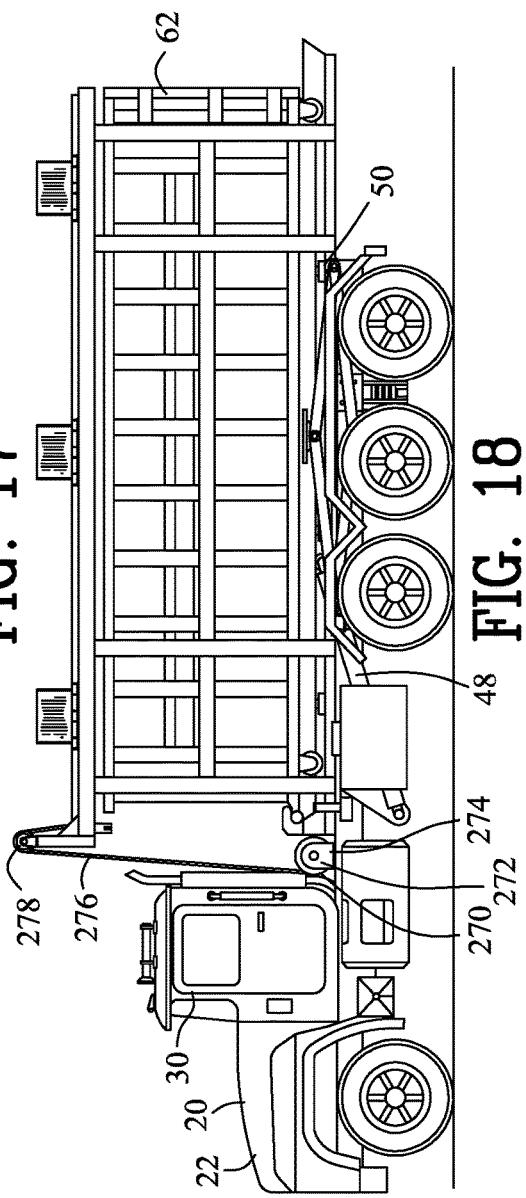

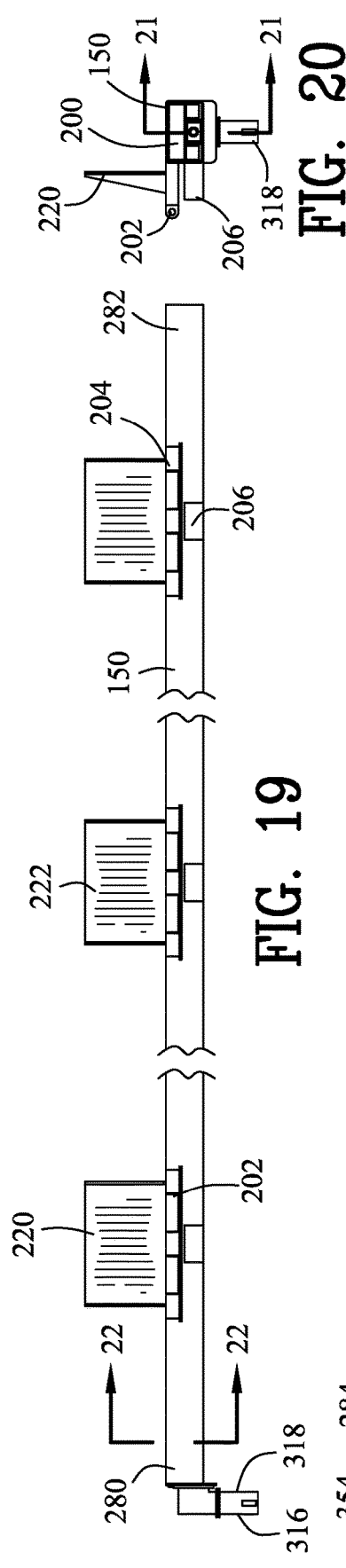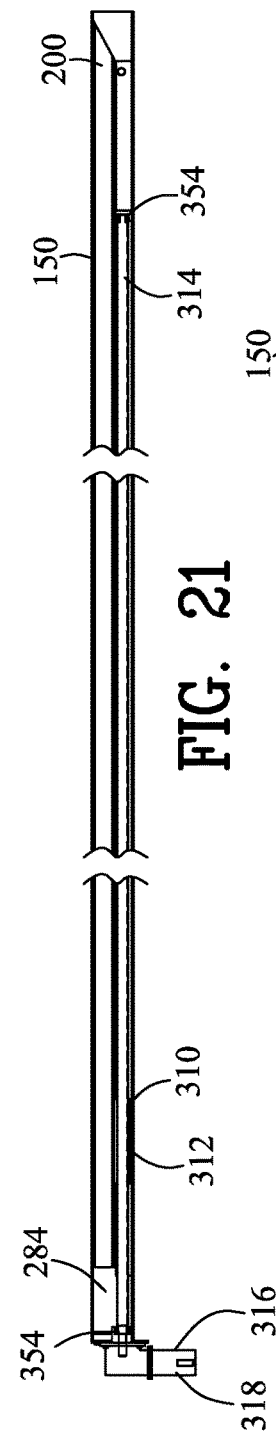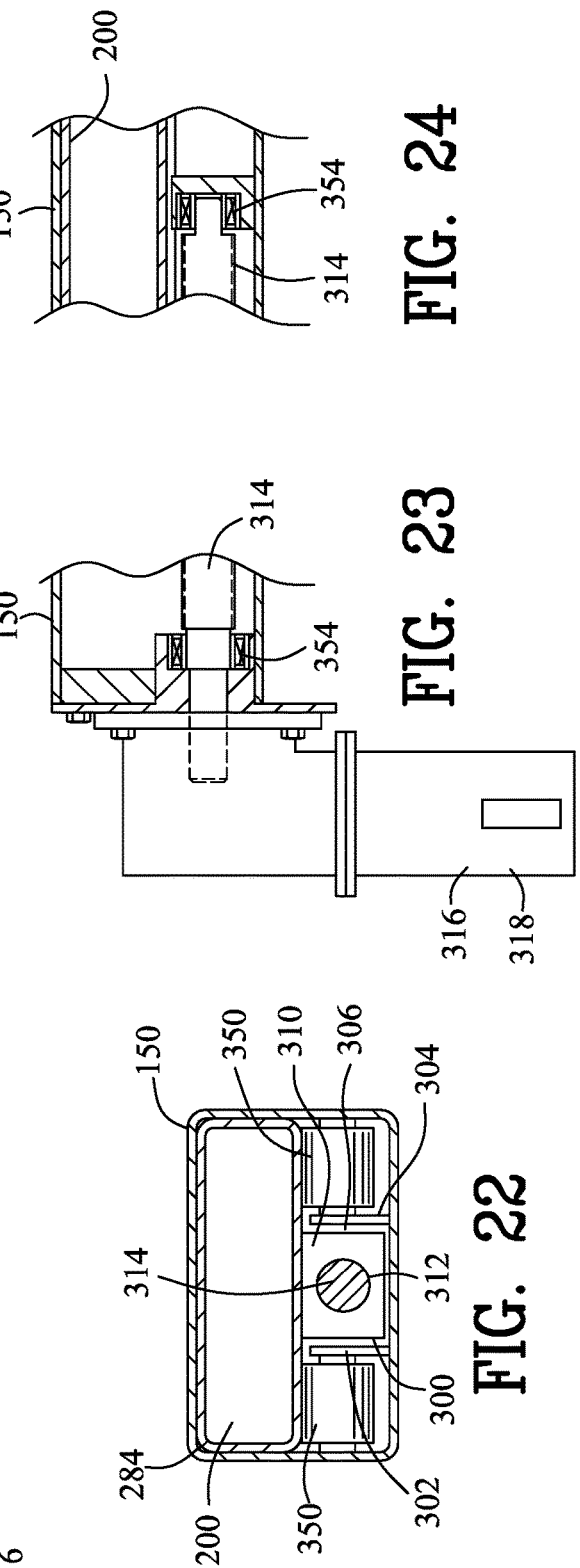

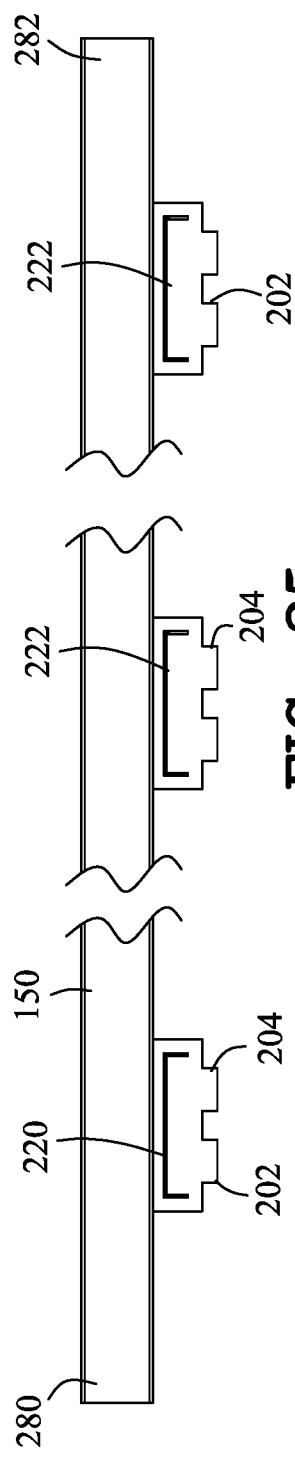
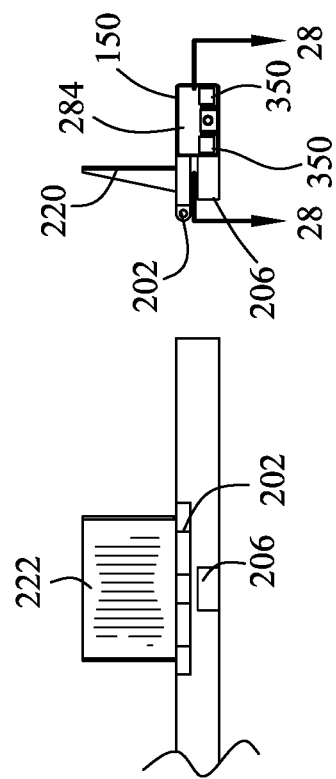
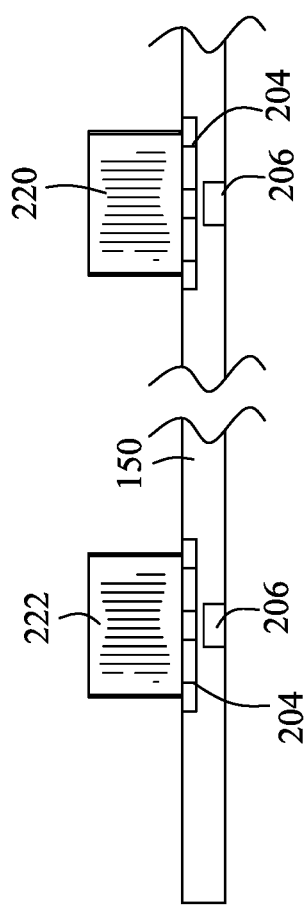
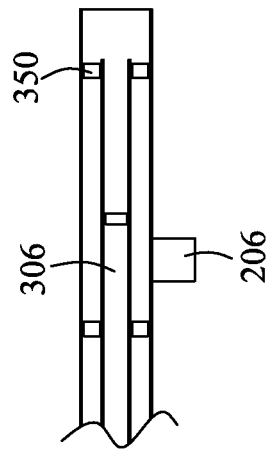
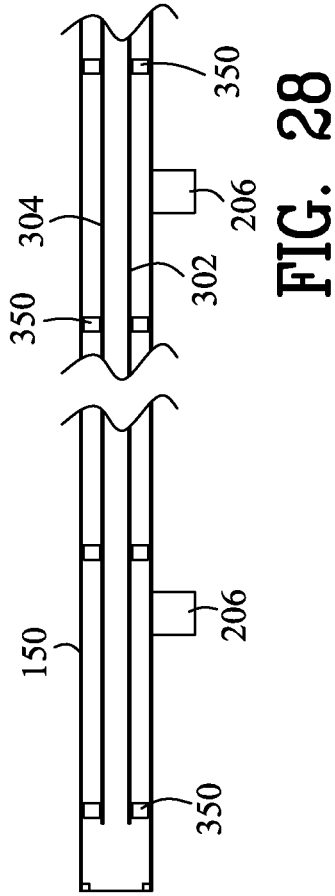
FIG. 25
FIG. 26
FIG. 27
FIG. 28

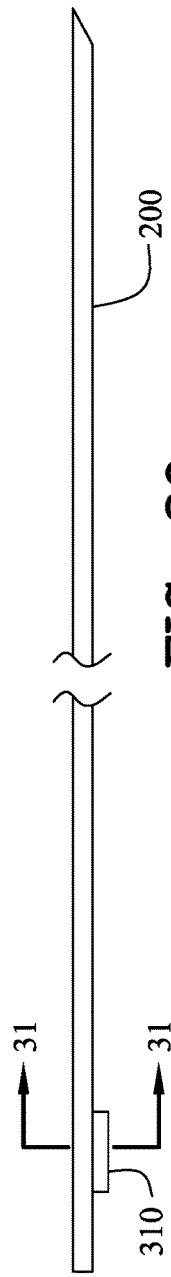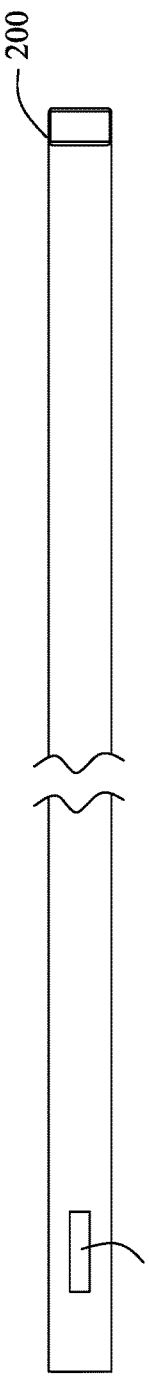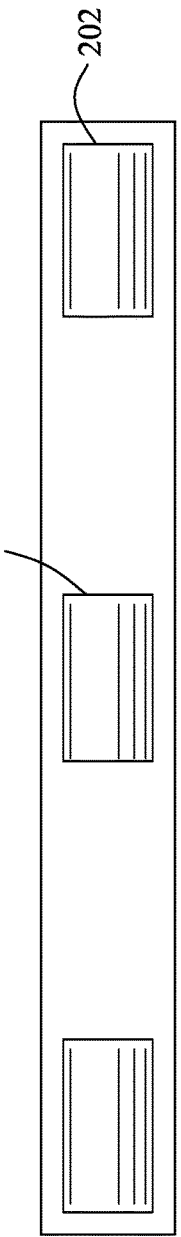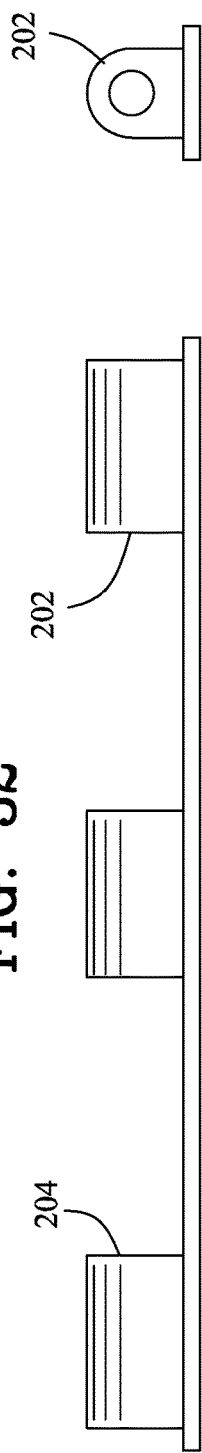
FIG. 29
FIG. 30
FIG. 31
FIG. 32
FIG. 33
FIG. 34

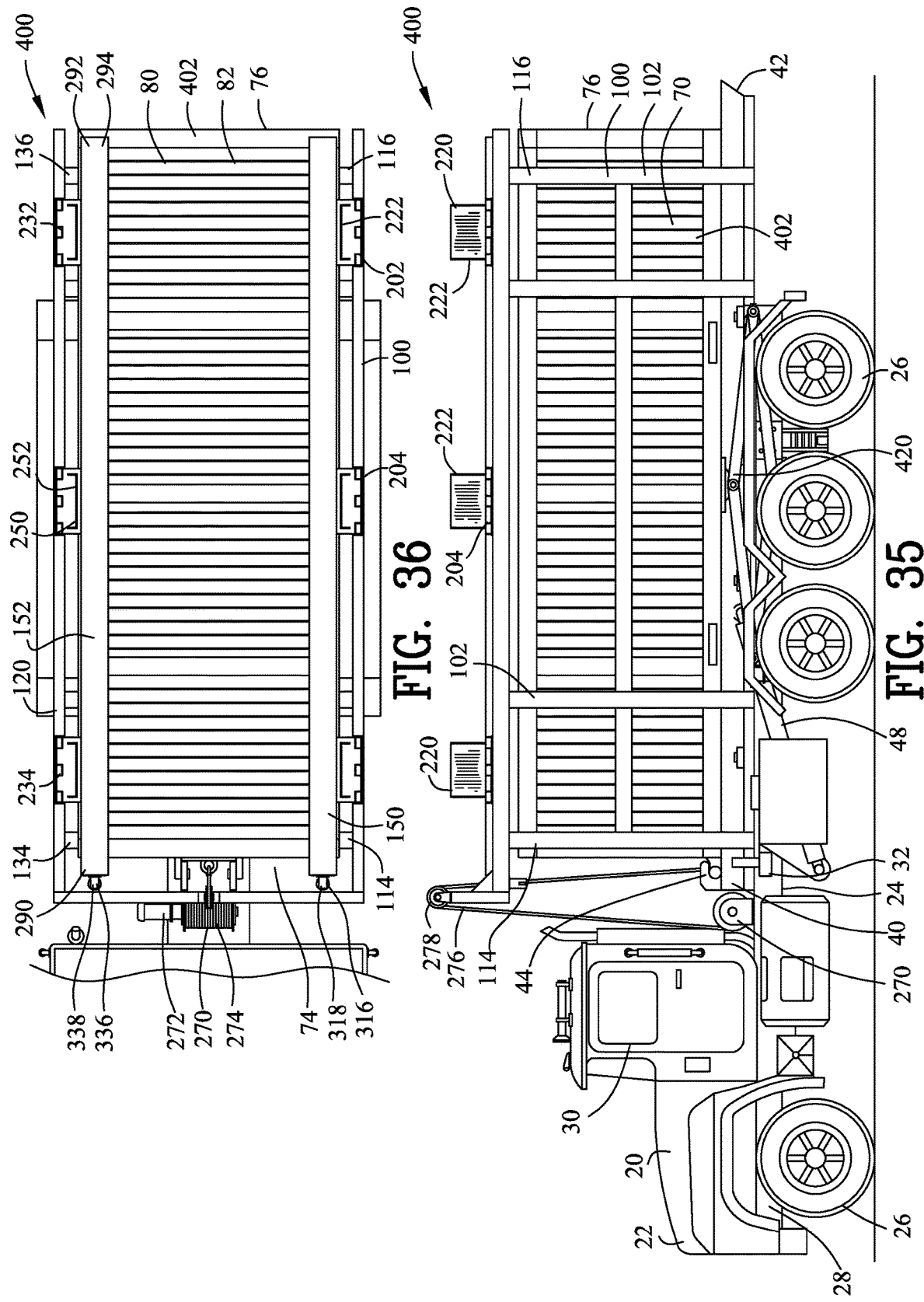

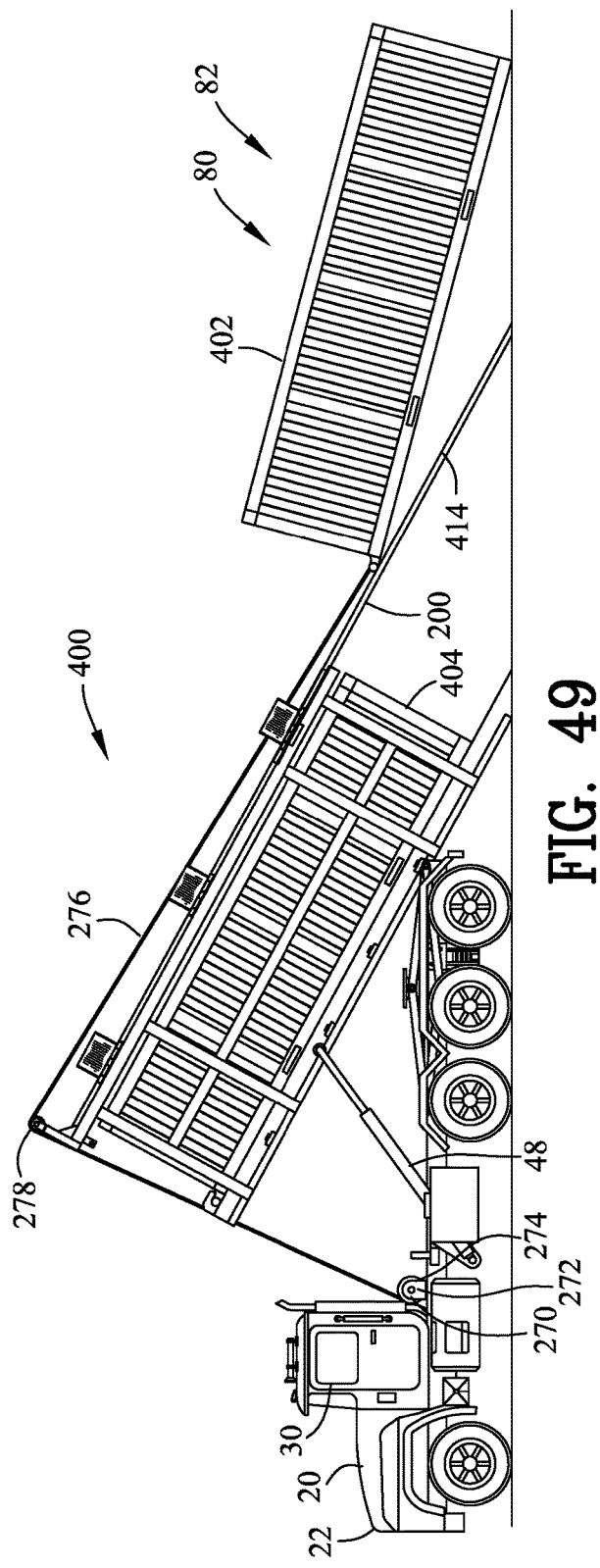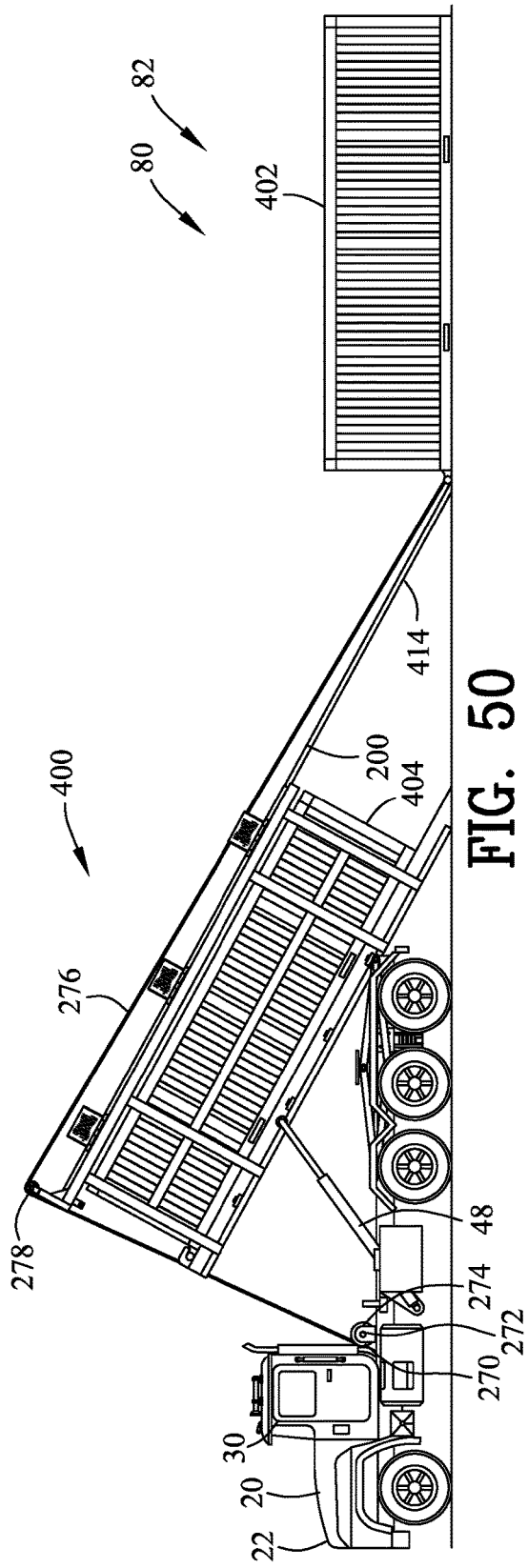

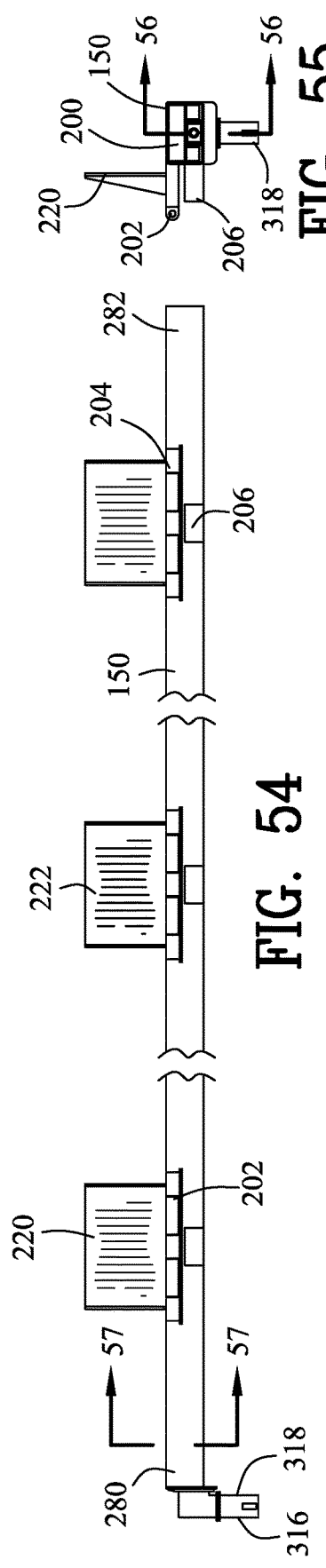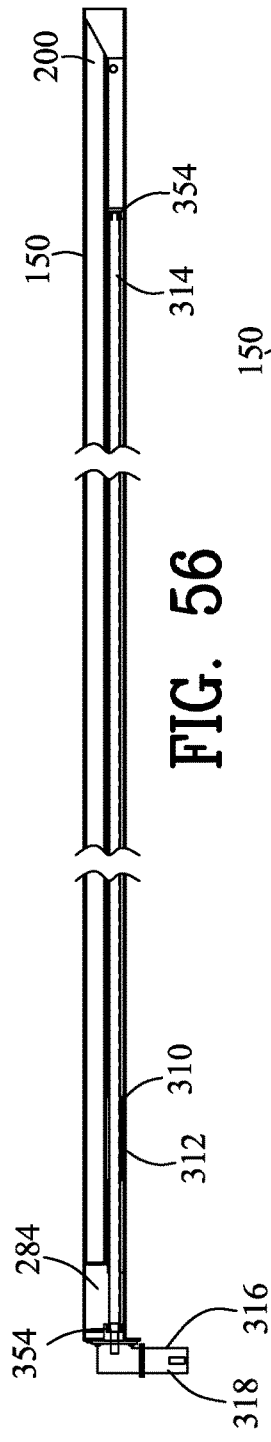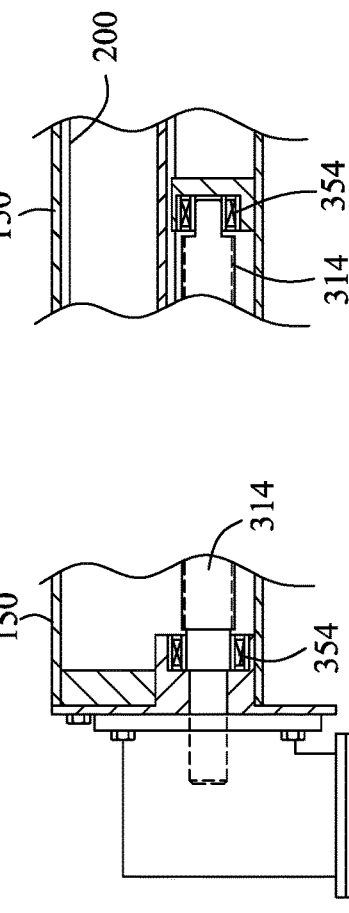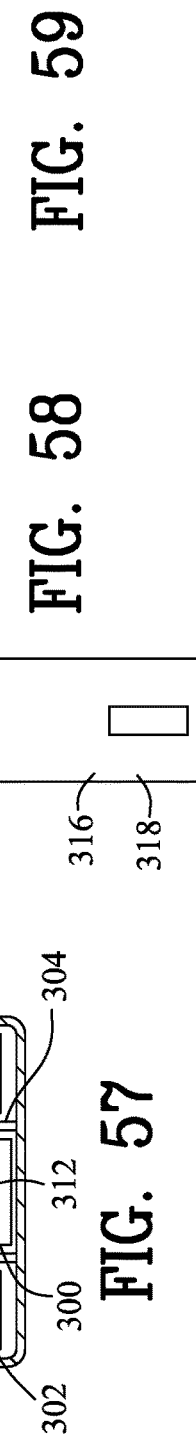

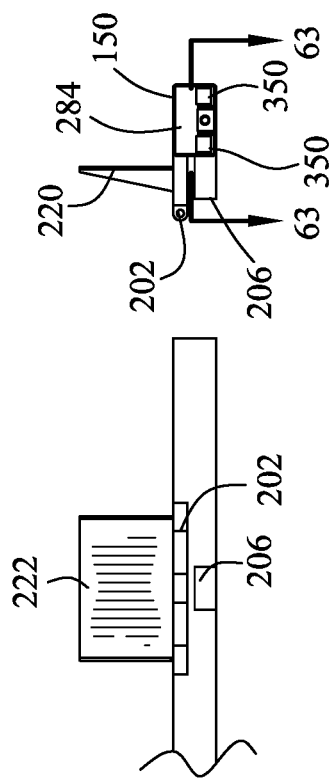
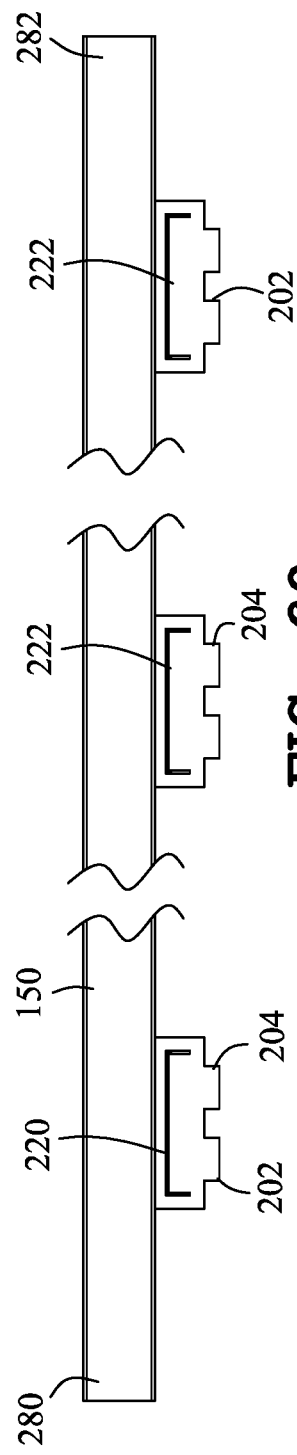
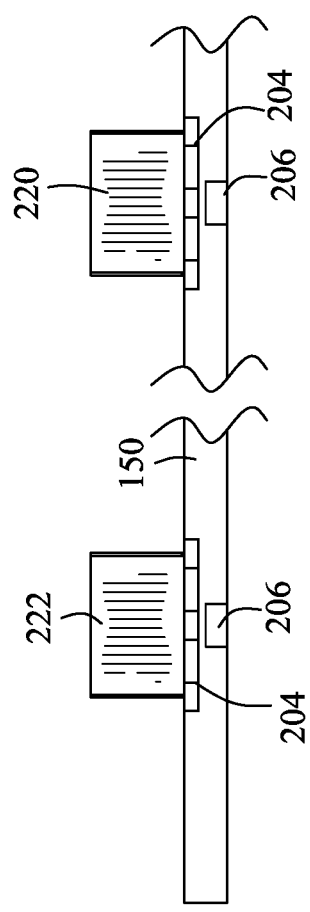
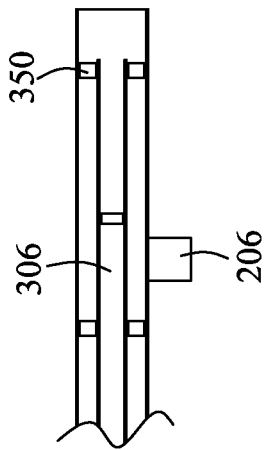

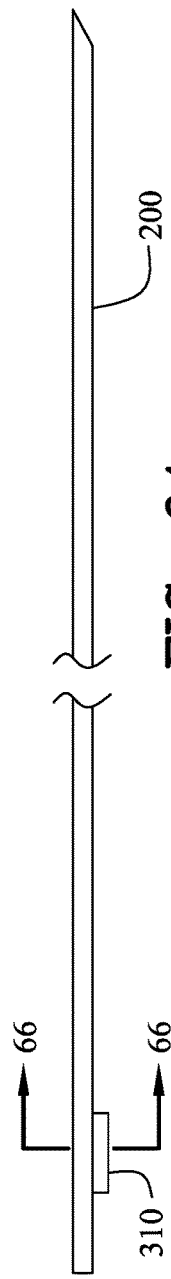
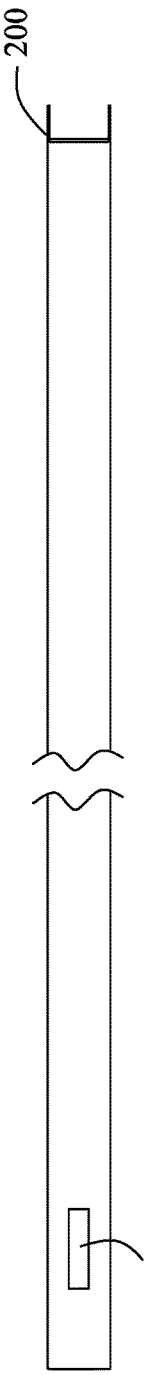
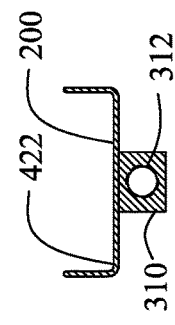
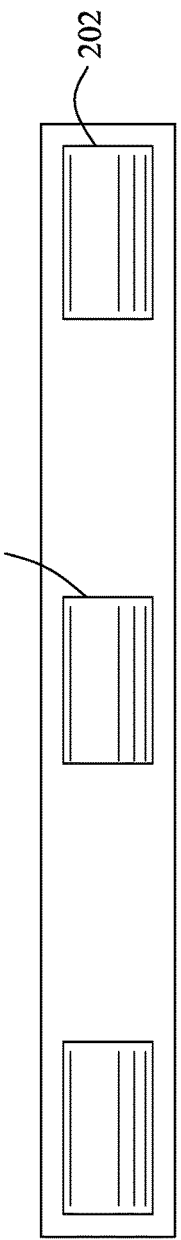
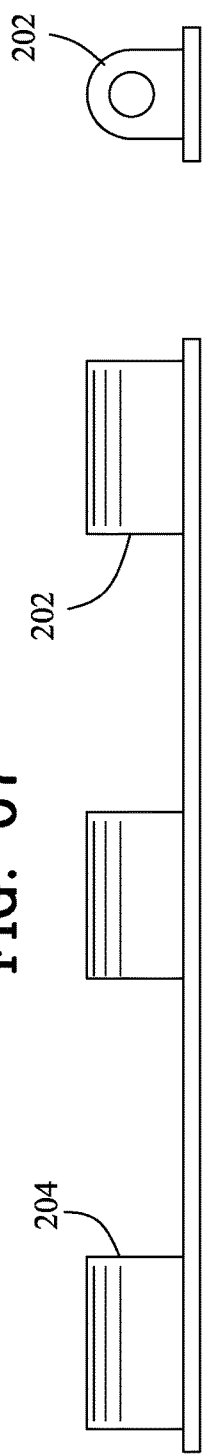

OBJECT HANDLING DEVICE AND METHOD

CROSS-REFERENCE TO RELATED APPLICATIONS

This application is a continuation in part of U.S. patent application Ser. No. 16/398,814 filed Apr. 30, 2019 now U.S. Pat. No. 10,850,657, All subject matter set forth in U.S. patent application Ser. No. 16/398,814 now U.S. Pat. No. 10,850,657 is hereby incorporated by reference into the present application as if fully set forth herein.

U.S. patent application Ser. No. 16/398,814 is a divisional patent application of U.S. patent application Ser. No. 15/483,609 filed Apr. 10, 2017 now U.S. Pat. No. 10,322,874, All subject matter set forth in U.S. patent application Ser. No. 15/483,609 now U.S. Pat. No. 10,322,874 is hereby incorporated by reference into the present application as if fully set forth herein.

U.S. patent application Ser. No. 15/483,609 now U.S. Pat. No. 10,322,874 claims benefit of U.S. Patent Provisional Application No. 62/322,205 filed Apr. 13, 2016. All subject matter set forth in Provisional Application No. 62/322,205 is hereby incorporated by reference into the present application as if fully set forth herein.

U.S. patent application Ser. No. 16/398,814 is a divisional patent application of U.S. patent application Ser. No. 15/483,609 filed Apr. 10, 2017 now U.S. Pat. No. 10,322,874. All subject matter set forth in U.S. patent application Ser. No. 15/483,609 now U.S. Pat. No. 10,322,874 is hereby incorporated by reference into the present application as if fully set forth herein.

U.S. patent application Ser. No. 15/483,609 now U.S. Pat. No. 10,322,874 claims benefit of U.S. Patent Provisional Application No. 62/322,205 filed Apr. 13, 2016. All subject matter set forth in Provisional Application No. 62/322,205 is hereby incorporated by reference into the present application as if fully set forth herein.

BACKGROUND OF THE INVENTION

Field of the Invention

This invention relates to displacing an object and more particularly to an object handling device and method coupled to a vehicle.

Background of the Invention

Object handling devices have been utilized for transporting various items. One such item may include a standardized container. These container systems utilized the mechanical loading of the contents of standardized containers into garbage trucks. Over the years, they have evolved into a variety of trash containment devices. They now come in a wide variety of sizes from small residential containers to large containers with a capacity between 10 and 45 cubic yards. These large containers, often referred to as "roll-off" dumpsters are rolled off the large trucks delivering or retrieving them via extended ramps or tilting truck beds. The ease with which these large containers may be delivered or retrieved, allows them to be placed in relatively unobtrusive locations.

Since the retrieval of a filled dumpster generally results in the replacement delivery of an empty unit, the total operation of replacement of a filled container in a first location, requires the unloading of an empty unit in a second location, relocation of the filled unit from a first to a third location, relocation of the empty unit from a second location to a first location, and finally retrieval of the filled unit from the third location. These actions, in addition to be time consuming, may create rather extreme logistics problems due to the size of the containers and the available space proximate the container site.

There have been many in the prior art who have attempted to solve these problems with varying degrees of success. None, however completely satisfies the requirements for a complete solution to the aforestated problem. The following U.S. patents are attempts of the prior art to solve this problem.

U.S. Pat. No. 3,202,305 to Dempster discloses the combination of a vehicle, a separable body unit, means mounting the body unit on the vehicle for bodily detachment and removal from the vehicle. Power means are on the vehicle for moving the body unit on or off the vehicle. A pair of lifting arms are pivotally mounted on the body unit and are between one position wherein the arms extend in front of the vehicle when the body unit is mounted on the vehicle and another position wherein the arms extend above the body unit. The pair of lifting arms are bodily removable from the vehicle with the body unit. Fluid pressure actuated means are on the body unit for moving the arms between the positions. A source of fluid pressure is on the vehicle. A fluid pressure supply line has a detachable coupling between the source of fluid pressure on the vehicle and the fluid pressure actuated means on the body unit.

U.S. Pat. No. 3,362,552 to Thiele discloses a changeable vehicle body assembly comprising in combination a first frame means mountable on a vehicle chassis and having a pair of spaced apart longitudinal members. A second frame means has a pair of spaced apart longitudinal members each positionable along a respective longitudinal member of the first frame means. A forward pair of lift arms are pivotally connected at their lower ends to the forward ends of the first frame means by pivot means and pivotally connected at their upper ends to the forward ends of the second frame means by pivot means. At least one pivotal connecting means is on each lift arm being readily removable. A rear pair of lift arms are pivotally connected at their lower ends to the rear ends of the first frame means and pivotally connected at their upper ends to the rear ends of the second frame means. The lift arms pivotally position the second frame means in a generally parallel attitude to the first frame means and the forward pair of lift arms are parallel to the rear pair of lift arms. A power lift means is directly connected to the second frame means and connects to the vehicle to move the second frame means up and down with respect to the first frame means in a generally parallel attitude when the removable pivot means of the forward pair of lift means is in place. The power lift means on removal of the removable pivot means from the forward pair of lift arms pivot the second frame means simultaneously while in alignment with said rear pair of lift arms about the rear lift arms pivotal connection with the first frame means. A vehicle body means are received on the second frame means and have independent support means for supporting the same when the independent support means are in supporting position on retraction and lowering of the second frame means from an elevated generally parallel position above the first frame means whereby to separate the vehicle body for a replacement.

U.S. Pat. No. 3,499,562 to Phillips discloses an airplane catering vehicle comprising a chassis mounted on ground-engaging wheels having brakes. An operators cab is mounted at the front end at one side of center of the chassis.

The cab has a front, rear, top and side windows to provide full view ahead, above and to both sides at all times and rearwardly when the body of the vehicle is raised. A body including a frame is mounted for elevational movement on the chassis, means for raising and lowering the frame in a generally vertical direction. A portion of the frame is located at the other side of center of the chassis and extends forwardly of the cab and beyond the front of the chassis. A floor is fixed to the upper surface of the frame, a housing carried by the frame rearwardly of the cab, the housing has a door located generally in alignment with the portion of the frame to provide access to the housing therefrom. Resilient bumper means are mounted on the front end of the frame portion and project forwardly beyond the same, sensing means operatively associated with the bumper means and electrically connected to solenoid means carried by the brakes, whereby the platform can be moved adjacent to an opening in an airplane to permit ready transfer of the material from within the housing to the plane, and contact between the airplane and the bumper means will energize the brakes to stop the vehicle.

U.S. Pat. No. 3,612,315 to Blackburn discloses a cargo containerization apparatus and system of a type wherein one or more selectively movable containers for cargo and the like are adapted for individual or collective transportation from and to material or cargo loading and discharge points. The individual units are adapted for transportation on truck chassis, trains, or the like, and are readily placeable on or removed from the conveyance for temporary storage following long-distance hauling and the like, or pickup or local handling. The system includes operating and control means for raising and lowering the individual container units, or a plurality thereof, and is particularly suited and adapted for so raising and lowering an individual unit with respect to an adjoining unit in a line or in areas of restricted clearance to prevent damage to the container during the lifting or placement operation.

U.S. Pat. No. 4,005,784 to Wilson discloses a transport vehicle comprises a rigid rectangular frame which is open at one end, a vertically movable load supporting floor and a longitudinally extending conveyor supported on and near the top of a side wall of the frame. A transverse conveyor extends across the top of the frame near the level of the longitudinal conveyor and deflector means may be provided to transfer articles from the latter to the former. Thus hay bales picked up in the field and delivered to the longitudinal conveyor may be distributed over the floor and after one complete layer of bales is formed, the floor may be lowered to enable a second layer to be similarly formed on the first layer and so on to form a stack on the floor. The frame is preferably open at the bottom to enable the floor to be lowered until it rests on the ground and the vehicle may be provided with pusher means by which the stack may be pushed from the floor onto the ground. Preferably however the floor after being lowered onto the ground may be detached from the vehicle so that the latter may then be moved forwardly away from the floor and the stack thereon. Means are also preferably provided for subsequently pulling the floor forwardly into register with the vehicle and during this operation the stack may abut against closed doors on the open end of the vehicle whereby the stack is progressively pushed from the floor.

U.S. Pat. No. 4,325,666 to Chain discloses a materials handling device suitable for mounting on a structure, such as a pickup truck, so that heavy materials, such as cylindrical bales of hay, can be selectively loaded and unloaded onto the pickup truck for transportation from one location to another. The materials handling device comprises a housing assembly pivotally connected to the support structure so that the housing assembly is substantially vertically disposed adjacent an edge of the support structure; a frame slideably positioned within the housing assembly; a material engaging assembly mounted on the lower end portion of the frame so as to extend in a direction away from the support structure; and a frame and housing actuator assembly disposed between and interconnecting the support structure and the upper end portion of the frame. The actuator assembly, which is pivotally connected to the frame and the support structure, selectively moves the frame between a vertically lowered position and the vertically raised position. When the frame is in the vertically raised position the actuator assembly selectively moves the housing assembly between the vertically disposed position and a horizontally disposed position wherein the housing assembly, and thus the frame, are disposed on the support structure. The materials handling device further includes a cradle assembly pivotally connected to the support structure so as to be substantially aligned with the housing and the frame, and a cradle actuator assembly disposed between and pivotally connected to the support structure and the cradle assembly.

U.S. Pat. No. 5,100,279 to Bjerk discloses a material handling apparatus includes a tractor/trailer vehicle which can mount and dismount ore receiving containers, which can transport the containers between a collection site and a deposit site and which can dump ore out of a container at the deposit site. Each container defines a housing with an interior and an open rear area. A tailgate assembly includes a pair of bell crank arms pivotally secured on either side of the container and a tailgate mounted between first arm portions thereof to close the open rear area. A transport frame, preferable on the trailer section of the tractor/trailer vehicle, defines a support for a tiltable bed pivoted mounted on a rear portion of the frame. A linkage assembly is centrally mounted on each side of the tiltable bed and each linkage assembly includes a cam member driven by a pair of first hydraulic cylinders. Actuation of these cylinders first causes the cam members to act against second arm portions of the bell crank arms to raise the tailgate after which, and upon abutment with a limit stop block, continued actuation tilts the bed to dump ore out of the container. A hydraulically actuated lift arm is used to mount and dismount each container from the trailer section.

U.S. Pat. No. 5,417,540 to Cox discloses a system for hauling cargo containers which includes elevatable frames on which the containers are supported during transportation, loading and unloading of the containers. The frames are designed to be either directly mounted to conventional trailers or other transport vehicles or interlocked to alignment members mounted to such vehicles. The frames include support legs which are movable outwardly and pivotable vertically so as to support the frames in elevated relationship to the transport vehicles. Lifting devices are mounted on the frames to raise and lower the frames relative to the vehicles so that the containers may be loaded or unloaded relative to the vehicles without supplemental lifts or cranes. In a separate embodiment, the transport vehicles include lifting devices for elevating the frames for purposes of loading or unloading.

U.S. Pat. No. 5,630,694 to Ihara discloses an integrated air cargo/container handling system is presented in which the motive power section and the container handling section are integrated. Unlike the conventional system which requires coordination of three handling units (the power section, a transport section and a loading section) and separate operators for loading and unloading of containers, the present handling system has only two sections: the motive power section and the container handling section. The container handling section includes three elevators: a front elevator, a middle elevator and a back elevator. At the cargo terminal, eight containers are loaded onto the handling system using the back elevator and the middle elevator, and the containers are secured on the back and middle elevators. The handling system is driven to a target aircraft at a speed of up to 50 Km/hr, and the front elevator is positioned in place at the cargo bay of the aircraft. The front and the middle elevators, in conjunction with an assisting elevator if necessary, transfer the containers from the middle elevator to the front elevator and into the aircraft. The containers from the back elevator are transferred to the middle elevator and loaded into the aircraft. The handling system is operated with one operator who makes all the necessary decisions about the movement of each container, thus greatly facilitating loading and unloading of the container to and from the aircraft and cargo terminals.

U.S. Pat. No. 5,743,701 to Green discloses a roll on roll off receptacle handling system, that can load and unload a receptacle, store the receptacle and transporting the receptacle. The system includes a storage platform or independent support, such as portable jacks, for supporting the receptacle when it is rolled off the transport device. The transport device, that the receptacle can be rolled on to, can transport the receptacle to another location where it can be rolled off to another platform or independent support. The system also includes power assist devices for operating the jacks and for moving the receptacles to and from the transport device.

U.S. Pat. No. 5,829,946 to McNeilus discloses a container handling apparatus for receiving, engaging and releasing exchangeable chassis mounted containers, which may be truck bodies, or the like, capable of readily locking and unlocking a truck body to a supporting chassis is disclosed that is self-contained on the chassis. A truck body or container which may be self-supporting is also disclosed.

U.S. Pat. No. 6,155,769 to Robinson discloses a transportation system for liquid-carrying tanks. Each tank is mounted on a carrier unit and plural carrier units are transported by a single trailer or other vehicle. The trailer has an adjustable height, while each of the tank carrier units has adjustable height legs on its opposite sides. The units are loaded by backing the trailer under the carrier unit with the carrier unit legs extended and the trailer lowered. The trailer is then raised to lift the carrier unit to a transport position and the legs are in turn lifted to the transport position. For unloading, the reverse procedure is adopted, with the carrier unit legs being lowered to the ground and then the trailer being lowered and the trailer being pulled out from under the carrier unit. The carrier units are arranged with an angled base so that when the carrier is pulled out, the carrier unit will tilt forwardly to provide maximum drainage of the tank.

U.S. Pat. No. 6,705,823 to Bohata discloses a vehicle for lifting and transporting a container which is loaded and unloaded from the rear of the vehicle. The vehicle includes a base assembly attached to the vehicle with a substantially L-shaped boom pivotably attached to the base assembly. The substantially L-shaped boom has two segments connected to one another with a first segment of being pivotably attached to the left side or the base assembly and the second segment being pivotably attached to the right side of the base assembly. Each of the two segments has an upper portion and a lower portion with the lower portions being at an obtuse angle of from over 90.degree. to approximately 140.degree. relative to the upper portions. The pivotable attachment of the boom being attached to the lower portion of each of the segments to the base assembly, so that upon pivoting the boom, the upper portion of each of the two segments is pivoted from a substantially vertical position to a substantially horizontal position during a loading procedure. A lift assembly is pivotably attached to the boom for rearward loading and unloading of a container from the vehicle. The lift assembly includes a lifting element for pivoting the lift assembly relative to the boom.

U.S. Pat. No. 8,226,343 to Weeks discloses an apparatus and methods for loading, transporting and dumping a plurality of containers on a vehicle are provided. The apparatus includes a frame pivotally attachable a vehicle bed, an upper container engaging means and a lower container engaging means, both coupled to the frame. The upper container engaging means is moveable between a first height and a second height, the first height and the second height differing by greater than at least the height of a container. The lower container engaging means may be stowed and deployed. The upper container engaging means is moveable to the first height for loading a first container when the lower container engaging means is stowed. The lower container engaging means is deployed at the first height for loading the second container when the upper container engaging means is at the second height. The first container and second container may thereby be sequentially loaded and simultaneously transported on the vehicle.

U.S. Pat. No. 8,932,000 to Poulsen discloses a method for positioning a large load into a transport position is provided. According to the method, the load is placed upon a frame structure with a substantially horizontal extension. The raising device is placed transport plane underneath the frame structure. The raising device is then extended in a vertical extension reaching between the transport plane and the frame structure so that the frame structure and the load are raised above the transport plane and are held in position by the raising device. Subsequently, the vertical extension of the raising device is decreased into the transport position. Further, a method for positioning a large load into a storage position and a transport system for such methods are also provided.

United States Patent Application 2009/0263221 to Oldershaw discloses a device for assisting in the loading and off-loading of oil well tubulars from a trailer comprising a frame, a bottom side and a top side defining a bed. The bed comprises a front and a back defining a longitudinal axis. A bin retaining the tubulars may be formed by upright members and attached to the frame. At least two horizontal pipe support members may be oriented transverse to the bed of the trailer and raising-lowering means may be provided for the horizontal pipe support members. The horizontal pipe support members may be raised in near simultaneous manner. The raising-lowering means may comprise a ram member comprising an extendable piston, wherein the piston extends and retracts in parallel alignment with the longitudinal axis of the trailer. The raising-lowering means may further comprise cable members attached at a first end to the piston, and attached at a second end to the horizontal pipe support members, and may comprise a plurality of pulleys.

United States Patent Application 2014/0356110 to Rawdon discloses a cargo transfer system, a method of transferring cargo containers, and a method of handling cargo containers including a cargo transfer pallet capable of supporting a plurality of cargo containers thereon, a cargo loader vehicle capable of receiving the cargo transfer pallet thereon, and a cargo staging structure capable of receiving the cargo transfer pallet thereon and capable of receiving the cargo loader vehicle therein such that the cargo transfer pallet is supported by the cargo staging structure over at least a portion of the cargo loader vehicle.

Although the aforementioned prior art have contributed to the development of the art of dumpster containers, none of these prior art patents have solved the needs of this art.

Therefore, it is an object of the present invention to provide an improved object handling system and method.

Another object of this invention is to provide an improved object handling system which simplifies the exchange of a first object with a second object.

Another object of this invention is to provide an improved object handling system which simplifies the exchange of an empty unit for a full unit.

Another object of this invention is to provide an improved object handling system which minimizes the time required to exchange an empty unit for a full unit.

Another object of this invention is to provide an improved object handling system that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an improved object handling device coupled to a vehicle for handling a first object and a second object. The first object and the second object have a first side, a second side, a front, a rear and a bottom. The vehicle has a rear chassis. The object handling device comprises a lower support beam coupled to the rear chassis for supporting the first object. The lower support beam has a first side beam and a second side beam. A first side frame is coupled to the first side beam and extends vertically from the first side beam. The first side frame defines a lower end, an upper end, a front end and a rear end. A second side frame is coupled to the second side beam and extends vertically from the second side beam. The second side frame defines a lower end, an upper end, a front end and a rear end. The lower support beam, the first side frame and the second side frame define a lower object holding channel. A first upper support beam is coupled to the upper end of the first side frame. A second upper support beam is coupled to the upper end of the second side frame. The first upper support beam and the second upper support beam define an upper object holding channel. An object lift is coupled to the rear chassis for vertically lifting the first object from the lower object holding channel to the upper object holding channel. The first upper support beam and the second upper support beam support the first object in the upper object holding channel. A pivot pivotably couples the lower support beam to the rear chassis. A beam lift is coupled between the lower support beam and the rear chassis for pivoting the lower support beam and the first object relative to the rear chassis. A lower hoist links the lower support beam with the second object for positioning the second object within the lower object holding channel. A first telescoping support beam extends from the first upper support beam. A second telescoping support beam extends from second upper support beam. The first telescoping support beam and the second telescoping support beam define an angled object displacement channel. An upper hoist links with the first object for displacing the first object along the angled object displacement channel.

In a more specific embodiment of the invention, a first hinge pivotably couples the first upper support beam to the upper end of the first side frame. A first hinge stop is coupled to the first upper support beam and engages the upper end of the first side frame for positioning the first upper support beam in a general horizontal position for supporting the first object. The first hinge positions the first upper support beam in a general vertical position during vertically lifting the first object from the lower object holding channel to the upper object holding channel. A second hinge pivotably couples the second upper support beam to the upper end of the second side frame. A second hinge stop is coupled to the second upper support beam and engages the upper end of the second side frame for positioning the second upper support beam in a general horizontal position for supporting the first object. The second hinge positions the second upper support beam in a general vertical position during vertically lifting the first object from the lower object holding channel to the upper object holding channel.

In one embodiment of the invention, the first upper support beam includes a proximal end and a distal end. A first beam cavity extends within the first upper support beam and to the distal end of the first upper support beam. The first telescoping support beam slidably engages within the first beam cavity. The second upper support beam includes a proximal end and a distal end. A second beam cavity extends within the second upper support beam and to the distal end of the second upper support beam. The second telescoping support beam slidably engages within the second beam cavity.

The invention is also incorporated into the method of handling a first object and a second object. The first object and the second object have a first side, a second side, a front, a rear and a bottom. A vehicle has a rear chassis. The method comprises the steps of lifting the first object from a lower object holding channel defining a lower support beam, a first side frame and a second side frame above the rear chassis. The first object is positioned in an upper object holding channel defining a first upper support beam and a second upper support beam. The lower object holding channel, the upper object holding channel and the first object are pivoted relative to the rear chassis. The second object is positioned into the lower object holding channel. An angled object displacement channel defining a first telescoping support beam extend from the first upper support beam and a second telescoping support beam extend from the second upper support beam. The first object is lowered from the upper object holding channel and along the angled object displacement channel. The lower object holding channel, the upper object holding channel and the second object are pivoted relative to the rear chassis.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an elevational view of a dumpster handling device supporting a first dumpster within a lower dumpster holding channel;

FIG. 2 is a top view of FIG. 1;

FIG. 15 is a view similar to FIG. 14 illustrating an upper hoist lowering the first dumpster along the angled dumpster displacement channel;

FIG. 16 is a view similar to FIG. 15 illustrating an upper hoist fully lowering the first dumpster from the angled dumpster displacement channel;

FIG. 17 is a view similar to FIG. 16 illustrating the dumpster handling device being pivoted toward the vehicle and the first telescoping support beam displaced into the first upper support beam and the second telescoping support beam displaced into the second upper support beam;

FIG. 18 is a view similar to FIG. 17 illustrating the dumpster handling device being pivoted adjacent to the rear chassis of the vehicle;

FIG. 19 is an elevational view of the first upper support beam of FIG. 1;

FIG. 20 is a right side view of FIG. 19;

FIG. 21 is a sectional view along line 21-21 in FIG. 20;

FIG. 22 is a sectional view along line 22-22 in FIG. 19;

FIG. 23 is an enlarged view of a left end portion of FIG. 21;

FIG. 24 is an enlarged view of a portion of FIG. 21

FIG. 25 is a top view of the first upper support beam of FIG. 19;

FIG. 26 is an elevational view of the first upper support beam of FIG. 25;

FIG. 27 is a right side view of FIG. 26;

FIG. 28 is a sectional view along line 28-28 in FIG. 27;

FIG. 29 is an elevational view of the first telescoping support beam in FIG. 14;

FIG. 30 is a top view of FIG. 29;

FIG. 31 is a sectional view along line 31-31 in FIG. 29;

FIG. 32 is a top view of a primary hinge for pivoting the first upper support beam with a first side frame;

FIG. 33 is an elevational view of FIG. 32;

FIG. 34 is a right side view of FIG. 33;

FIG. 35 is an elevational view of a second embodiment of the invention including an object handling device supporting a first object within a lower object holding channel;

FIG. 36 is a top view of FIG. 35;

FIG. 49 is a view similar to FIG. 48 illustrating an upper hoist lowering the first object along the angled object displacement channel;

FIG. 50 is a view similar to FIG. 49 illustrating an upper hoist fully lowering the first object from the angled object displacement channel;

FIG. 54 is an elevational view of the first upper support beam of FIG. 35;

FIG. 55 is a right side view of FIG. 54;

FIG. 56 is a sectional view along line 56-56 in FIG. 55;

FIG. 57 is a sectional view along line 57-57 in FIG. 54;

FIG. 58 is an enlarged view of a left end portion of FIG. 56;

FIG. 59 is an enlarged view of a portion of FIG. 56

FIG. 60 is a top view of the first upper support beam of FIG. 54;

FIG. 61 is an elevational view of the first upper support beam of FIG. 60;

FIG. 62 is a right side view of FIG. 61;

FIG. 63 is a sectional view along line 63-63 in FIG. 62;

FIG. 64 is an elevational view of the first telescoping support beam in FIG. 48;

FIG. 65 is a top view of FIG. 64;

FIG. 66 is a sectional view along line 66-66 in FIG. 64;

FIG. 67 is a top view of a primary hinge for pivoting the first upper support beam with a first side frame;

FIG. 68 is an elevational view of FIG. 67; and

FIG. 69 is a right side view of FIG. 68.

Similar reference characters refer to similar parts throughout the several Figures of the drawings.

DETAILED DISCUSSION

Figure 3:
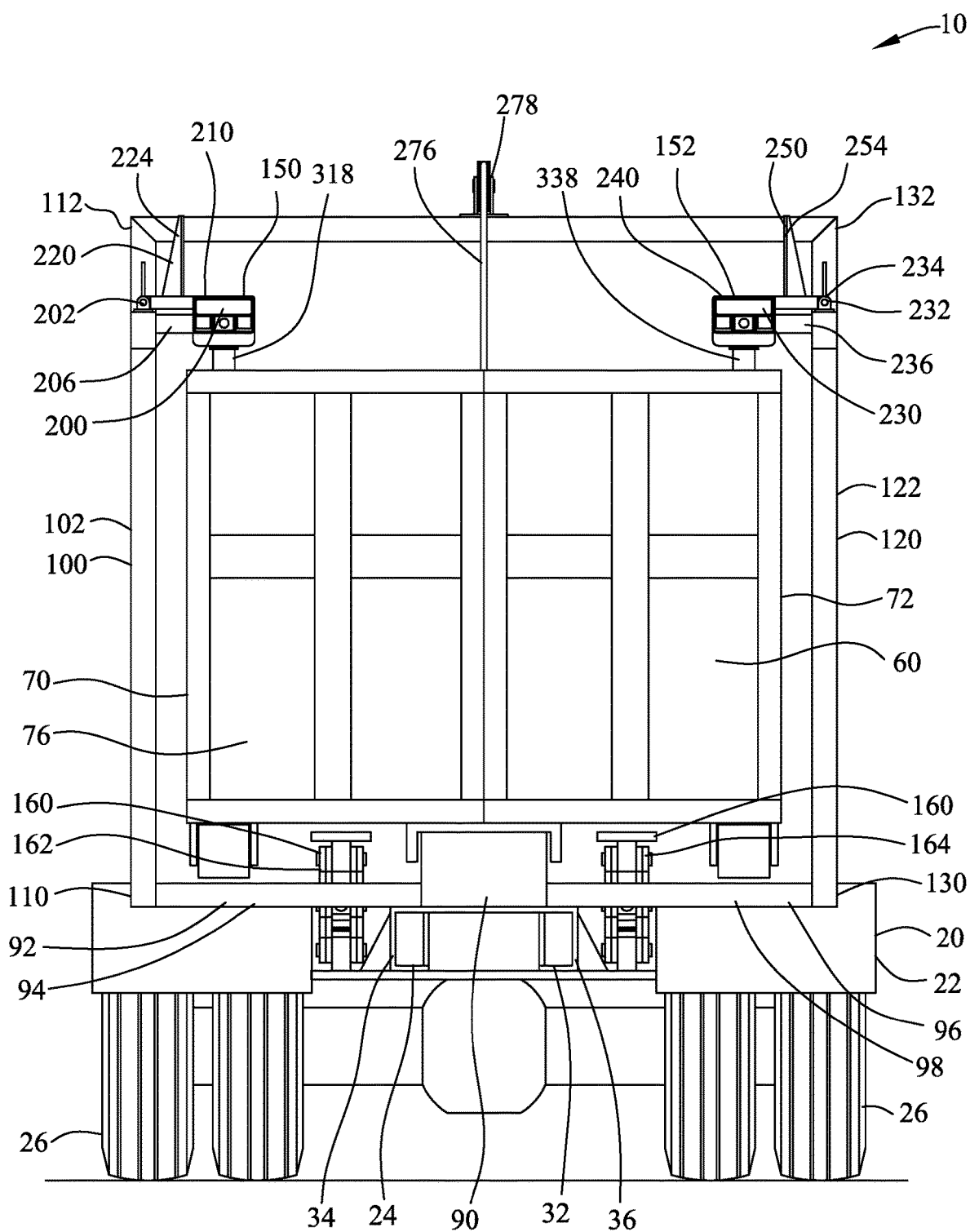
FIG. 3 is an enlarged right side view of FIG. 1.
Figure 4:
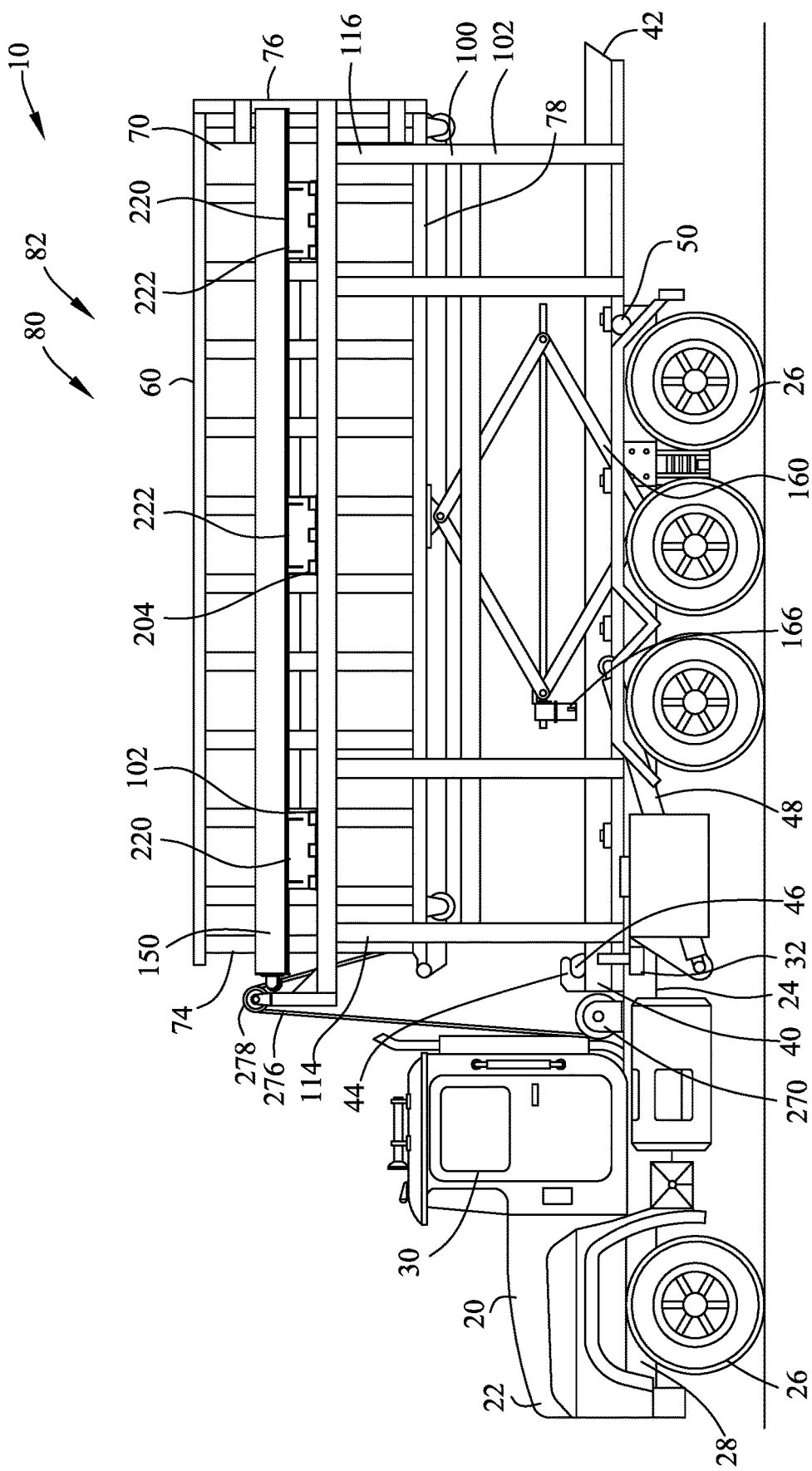
FIG. 4 is a view similar to FIG. 1 illustrating the first dumpster being elevated from a rear chassis of a vehicle.
Figure 5:
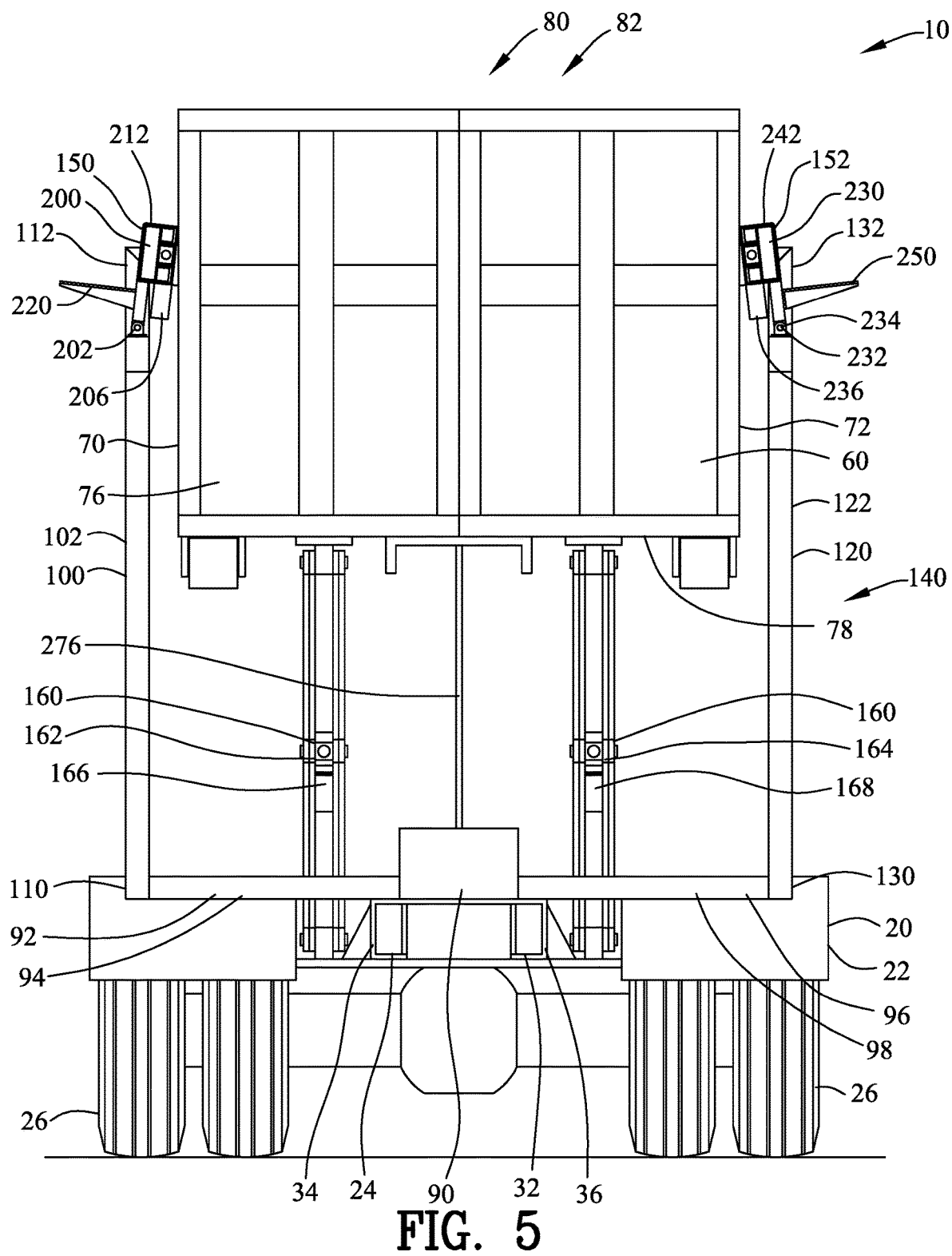
FIG. 5 is an enlarged right side view of FIG. 4.
Figure 6:
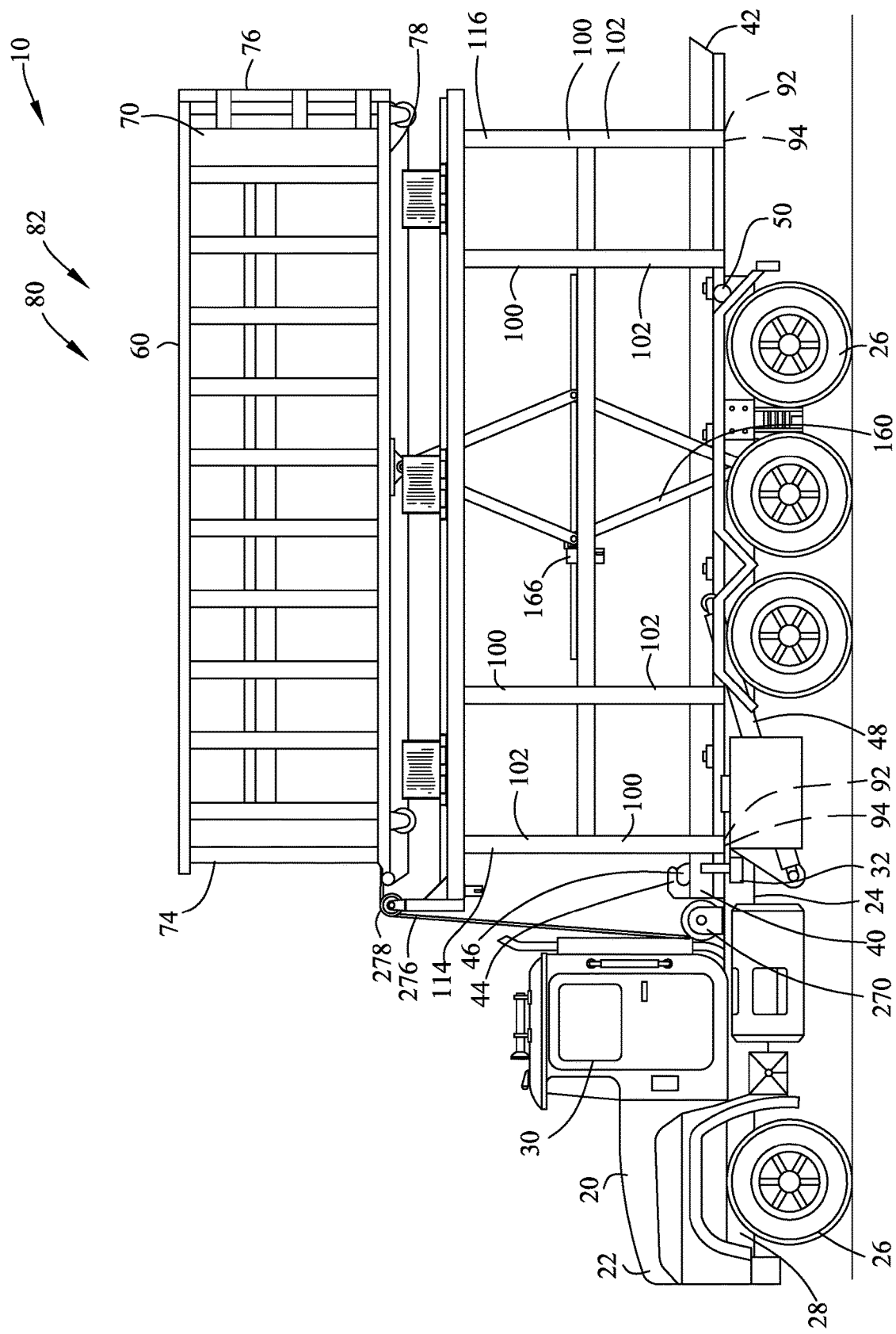
FIG. 6 is a view similar to FIG. 4 illustrating the first dumpster being further elevated from the rear chassis of the vehicle.
Figure 7:
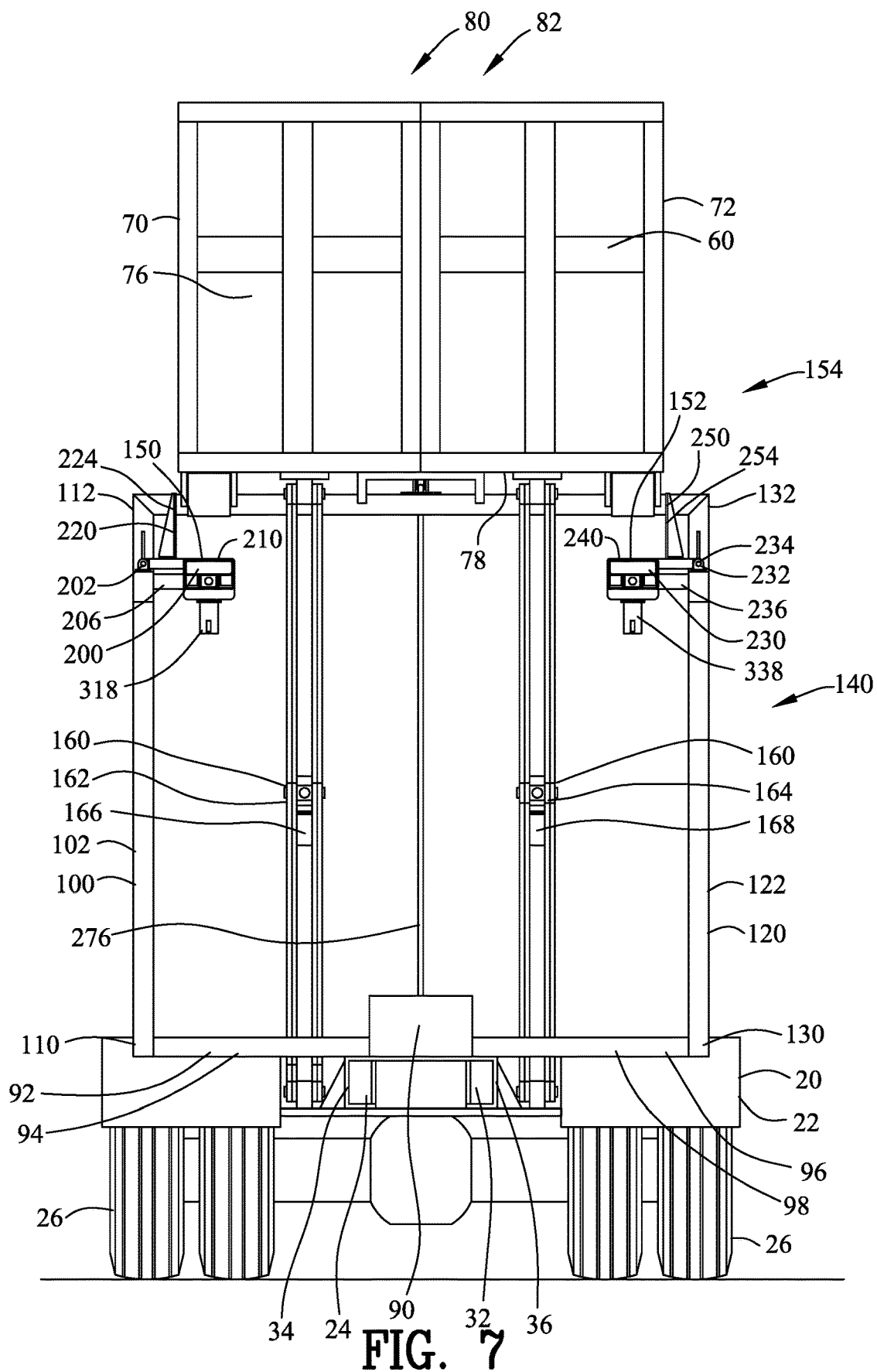
FIG. 7 is an enlarged right side view of FIG. 6.

FIGS. 1-34 are various views of a dumpster handling device 10 and method coupling to a vehicle 20 for handling a first dumpster 60 and a second dumpster 62. Preferably the vehicle 20 is a truck 22 having a chassis 24 supporting a plurality of wheels 26. The chassis 24 includes a front chassis 28 supporting a drive cab 30 and a rear chassis 32. A first roll frame 34 and a second roll frame 36 are pivoting coupled to the rear chassis 32. The first roll frame 34 and a second roll frame 36 extend from a proximal end 40 to a distal end 42. A retaining hook 44 is coupled between the first roll frame 34 and a second roll frame 36 and adjacent to the proximal end 40. A lower winch 46 is coupled between first roll frame 34 and a second roll frame 36 and adjacent to the proximal end 40 for pulling the first dumpster 60 and the second dumpster 62 onto the first roll frame 34 and the second roll frame 36. A beam lift 48 pivots the first roll frame 34 and a second roll frame 36 on a frame pivot 50 coupled to the rear chassis 32. The beam lift 48 is shown as a telescoping hydraulic cylinder.

The first dumpster 60 and the second dumpster 62 each have a first side wall 70, a second side wall 72, a front wall 74, a rear wall 76 and a bottom wall 78 for defining a dumpster chamber 80. Objects 82 including but not limited to construction waste may be placed into the dumpster chamber 80. The vehicle 20 loads the first dumpster 60 and the second dumpster 62 from a construction site and is transported to a waste facility.

The dumpster handling device 10 comprises a lower support beam 90 coupled to the rear chassis 32 for supporting the first dumpster 60. The lower support beam 90 has a first side beam 92 and a second side beam 96. Preferably, the first side beam 92 and the second side beam 96 include a plurality of first side beams 94 and a plurality of second side beams 98 respectively.

A first side frame 100 is coupled to the first side beam 92 and extends vertically from the first side beam 92. More specifically, the first side frame 100 may include a plurality of vertical frame members 102. The first side frame 100 defines a lower end 110, an upper end 112, a front end 114 and a rear end 116. Similarly, a second side frame 120 is coupled to the second side beam 96 and extends vertically from the second side beam 96. More specifically, the second side frame 120 may include a plurality of vertical frame members 122. The second side frame 120 defines a lower end 130, an upper end 132, a front end 134 and a rear end 136. The lower support beam 90, the first side frame 100 and the second side frame 120 define a lower dumpster holding channel 140.

A first upper support beam 150 is coupled to the upper end 112 of the first side frame 100. A second upper support beam 152 is coupled to the upper end 132 of the second side frame 120. The first upper support beam 150 and the second upper support beam 152 define an upper dumpster holding channel 154.

A dumpster lift 160 is coupled to the rear chassis 32 for vertically lifting the first dumpster 60 from the lower dumpster holding channel 140 to the upper dumpster holding channel 154. The first upper support beam 150 and the second upper support beam 152 support the first dumpster 60 in the upper dumpster holding channel 154. More specifically, the dumpster lift 160 may include a first scissor jack 162 and a second scissor jack 164 coupled between the lower support beam 90 and the rear chassis 32. The first scissor jack 162 and a second scissor jack 164 may be operated by a first jack electric motor 166 and a second jack electric motor 168.

The frame pivot 50 pivotably couples the lower support beam 90 to the rear chassis 32. The telescoping hydraulic cylinder 48 is coupled between the lower support beam 90 and the rear chassis 32 for pivoting the lower support beam 90 and the first dumpster 60 relative to the rear chassis 32. A lower hoist 180 links the lower support beam 90 with the second dumpster 62 for positioning the second dumpster 62 within the lower dumpster holding channel 140. The lower hoist 180 may include a lower hoist motor 182 operating a lower spool 184 and a lower cable 186.

A first telescoping support beam 200 extends from the first upper support beam 150. A second telescoping support beam 230 extends from second upper support beam 152. The first telescoping support beam 200 and the second telescoping support beam 230 define an angled dumpster displacement channel 260. An upper hoist 270 links with the first dumpster 60 for displacing the first dumpster 60 along the angled dumpster displacement channel 260. The upper hoist 270 may include an upper hoist motor 272 operating an upper spool 274 and an upper cable 276. The upper cable 276 may travel over an upper pulley 278.

A first hinge 202 pivotably couples the first upper support beam 150 to the upper end 112 of the first side frame 100. Preferably, first hinge 202 includes a first plurality of hinges 204. A first hinge stop 206 is coupled to the first upper support beam 150 and engages the upper end 112 of the first side frame 100 for positioning the first upper support beam 150 in a general horizontal position 210 for supporting the first dumpster 60. The first hinge 202 positions the first upper support beam 150 in a general vertical position 212 during vertically lifting the first dumpster 60 from the lower dumpster holding channel 140 to the upper dumpster holding channel 154 and when the first upper support beam 150 engages the first dumpster 60.

A second hinge 232 pivotably couples the second upper support beam 230 to the upper end 132 of the second side frame 120. Preferably, second hinge 232 includes a second plurality of hinges 234. A second hinge stop 236 is coupled to the second upper support beam 152 and engages the upper end 132 of the second side frame 120 for positioning the second upper support beam 152 in a general horizontal position 240 for supporting the first dumpster 60. The second hinge 232 positions the second upper support beam 152 in a general vertical position 242 during vertically lifting the first dumpster 60 from the lower dumpster holding channel 140 to the upper dumpster holding channel 154 and when the second upper support beam 152 engages the first dumpster 60.

A first guide arm 220 is coupled to the first upper support beam 150. Preferably, the first guide arm 220 includes a plurality of first guide arms 222. The first guide arm 220 has a general vertical position 224 when the first upper support beam 150 is in the general horizontal position 210. A second guide arm 250 is coupled to the second upper support beam 152. Preferably, the second guide arm 250 includes a plurality of first guide arms 252. The second guide arm 250 has a general vertical position 254 when the second upper support beam 152 is in the general horizontal position 240. The first guide arm 220 and the second guide arm 250 define a guiding channel 256 for guiding the first dumpster 60 in the upper dumpster holding channel 154.

The first upper support beam 150 includes a proximal end 280 and a distal end 282. A first beam cavity 284 extends within the first upper support beam 150 and to the distal end 282 of the first upper support beam 150. The first telescoping support beam 200 slidably engages within the first beam cavity 284. Similarly, the second upper support beam 152 includes a proximal end 290 and a distal end 292. A second beam cavity 294 extends within the second upper support beam 152 and to the distal end 292 of the second upper support beam 152. The second telescoping support beam 230 slidably engages within the second beam cavity 294.

A first beam track 300 is coupled to the first upper support beam 150 and extends into the first beam cavity 284. More specifically, the first beam track 300 may include a primary first rib 302 and a secondary first rib 304 defining a first track channel 306. A first track block 310 is coupled to the first telescoping support beam 200 and engages within the first beam track 300 for guiding the first telescoping support beam 200 within the first beam cavity 284. Similarly, a second beam track 320 is coupled to the second upper support beam 152 and extends into the second beam cavity 294. More specifically, the second beam track 320 may include a primary second rib 322 and a secondary second rib 324 defining a second track channel 326. A second track block 330 is coupled to the second telescoping support beam 230 and engages within the second beam track 320 for guiding the second telescoping support beam 230 within the second beam cavity 294.

A first threaded aperture 312 is within the first track block 310. A first threaded bar 314 is positioned within the first beam track 300 and threadably engages within the first threaded aperture 312. A first rotational force 316 is coupled to the first threaded bar 314 for rotating the first threaded bar 314 and displaces the first track block 310 relative to the first beam track 300 and displacing the first telescoping support beam 200 relative to the first upper support beam 150. A second threaded aperture 332 is within the second track block 330. A second threaded bar 334 is positioned within the second beam track 320 and threadably engages within the second threaded aperture 332. A second rotational force 336 is coupled to the second threaded bar 334 for rotating the second threaded bar 334 and displacing the second track block 330 relative to the second beam track 320 and displacing the second telescoping support beam 230 relative to the second upper support beam 152.

A first plurality of wheels 350 are coupled to the first upper support beam 150 and are positioned within the first beam cavity 284. The first plurality of wheels 350 support the first telescoping support beam 200 within the first beam cavity 284 and rotate during displacement of the first telescoping support beam 200 relative to the first upper support beam 150. Similarly, a second plurality of wheels 352 are coupled to the second upper support beam 152 and are positioned within the second beam cavity 294. The second plurality of wheels 352 support the second telescoping support beam 230 within the second beam cavity 294 and rotate during displacement of the second telescoping support beam 230 relative to the second upper support beam 152.

The first rotational force 316 may include a first electric motor 318 coupled to the proximal end 280 of the first upper support beam 150. The second rotational force 336 may include a second electric motor 338 coupled to the proximal end 290 of the second upper support beam 152. The first threaded bar 314 and the second threaded bar 334 may be secured to the first upper support beam 150 and the second upper support beam 152 respectively, by wheel bearings 354.

FIGS. 1-18 illustrate the method for handling a first dumpster 60 and a second dumpster 62. The method comprises the steps of lifting the first dumpster 60 from the lower dumpster holding channel 140 as shown in FIGS. 1-7. As the first dumpster 60 is lifted from the lower dumpster holding channel 140, the upper spool 274 is preferably rotated to permit additional upper cable 276 to released from the upper spool 274 while preventing the first dumpster 60 from being displaced from the upper dumpster holding channel 154.

As the first scissor jack 162 and the second scissor jack 164 lifts the first dumpster 60, the first dumpster 60 makes contact with the first upper support beam 150 and the second upper support beam 152 and causes the first upper support beam 150 and the second upper support beam 152 to pivot from the general horizontal position 210 and 240 respectively to a general vertical position 212 and 242 respectively. After the first scissor jack 162 and the second scissor jack 164 lifts the first dumpster 60 above the first upper support beam 150 and the second upper support beam 152, the first upper support beam 150 and the second upper support beam 152 pivot by gravity from general vertical position 212 and 242 respectively to the general horizontal position 210 and 240 respectively.

Figure 8:
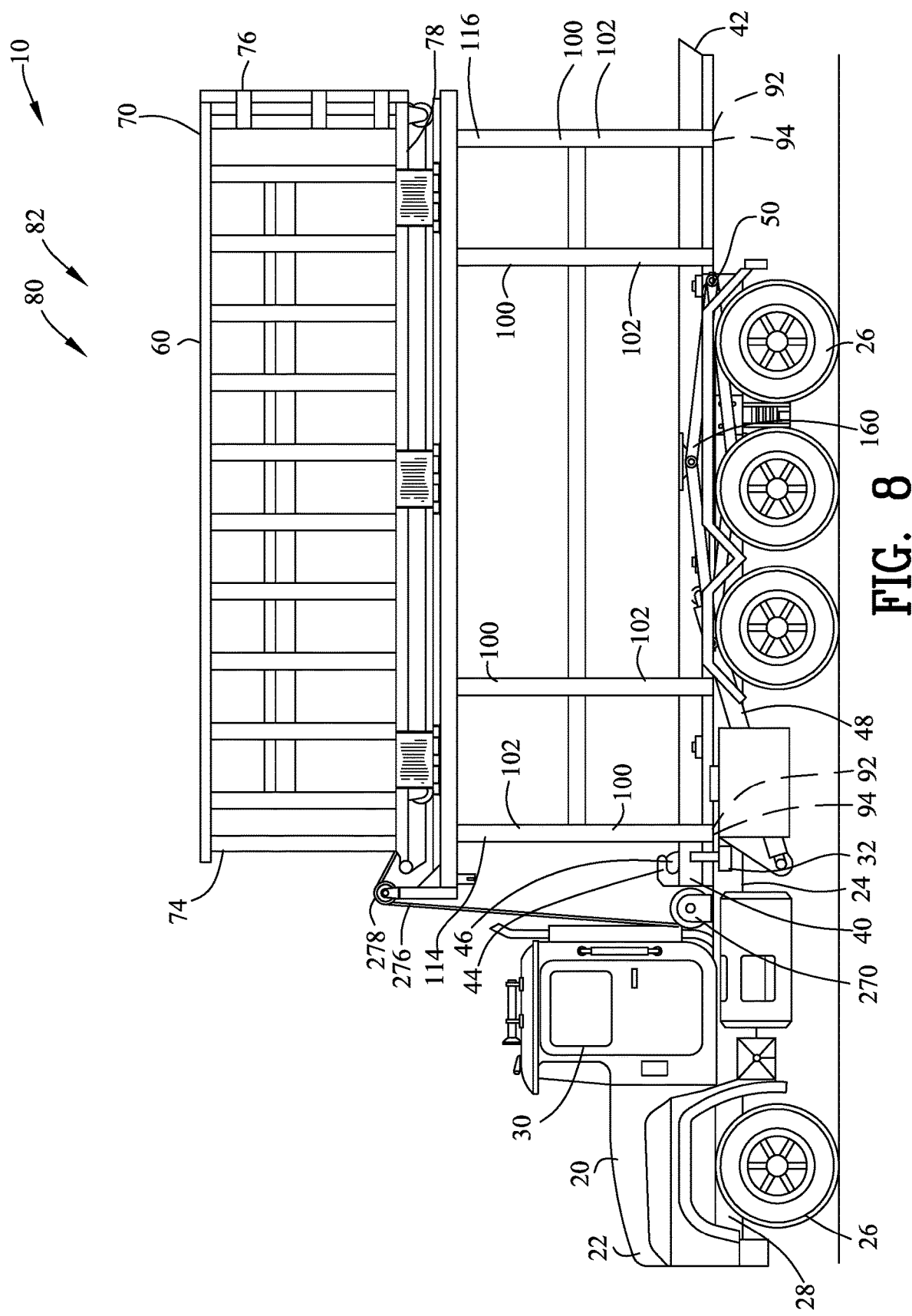
FIG. 8 is a view similar to FIG. 6 illustrating the first dumpster being supported in an upper dumpster holding channel.
Figure 9:
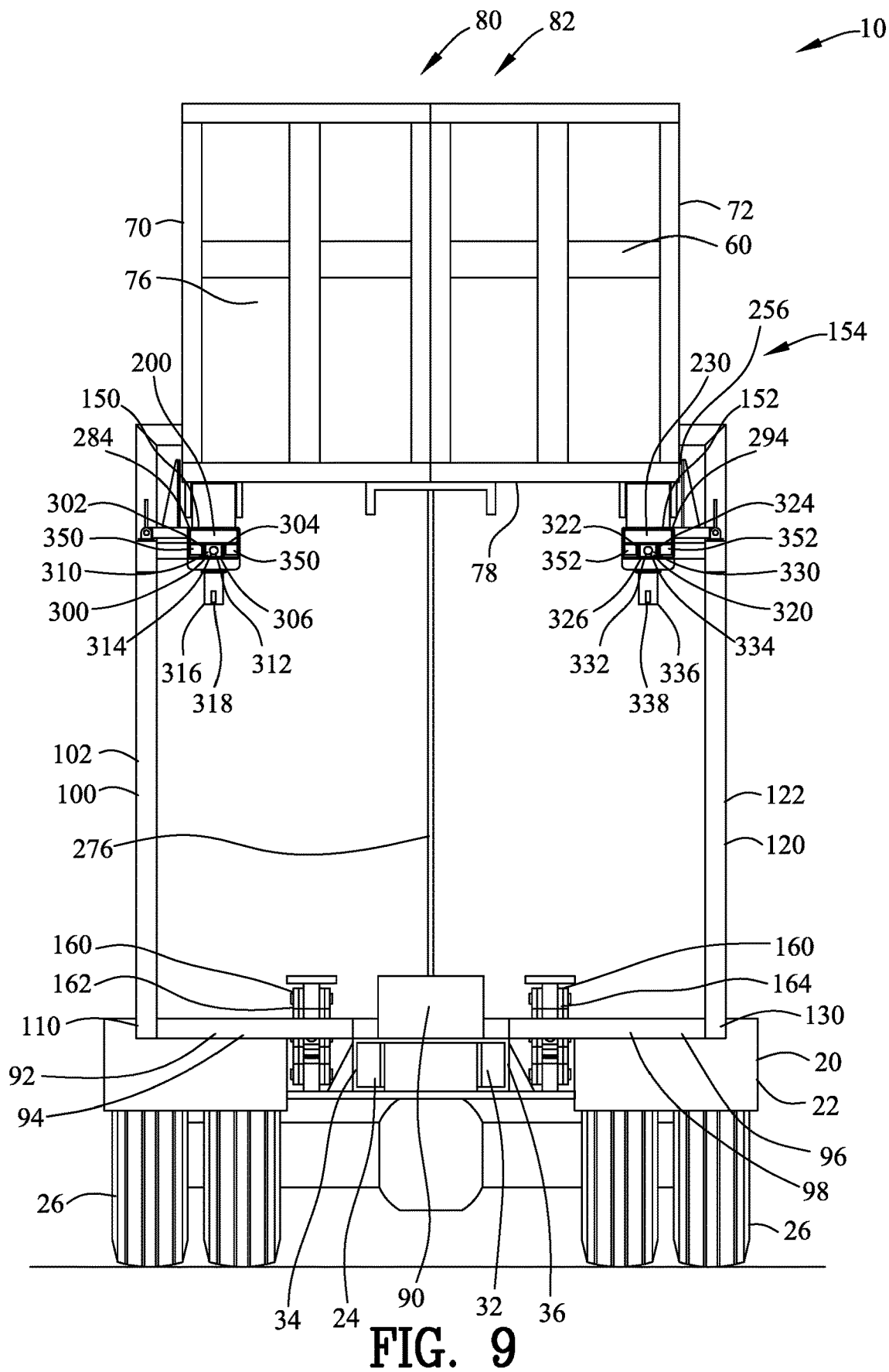
FIG. 9 is an enlarged right side view of FIG. 8.
Figure 10:
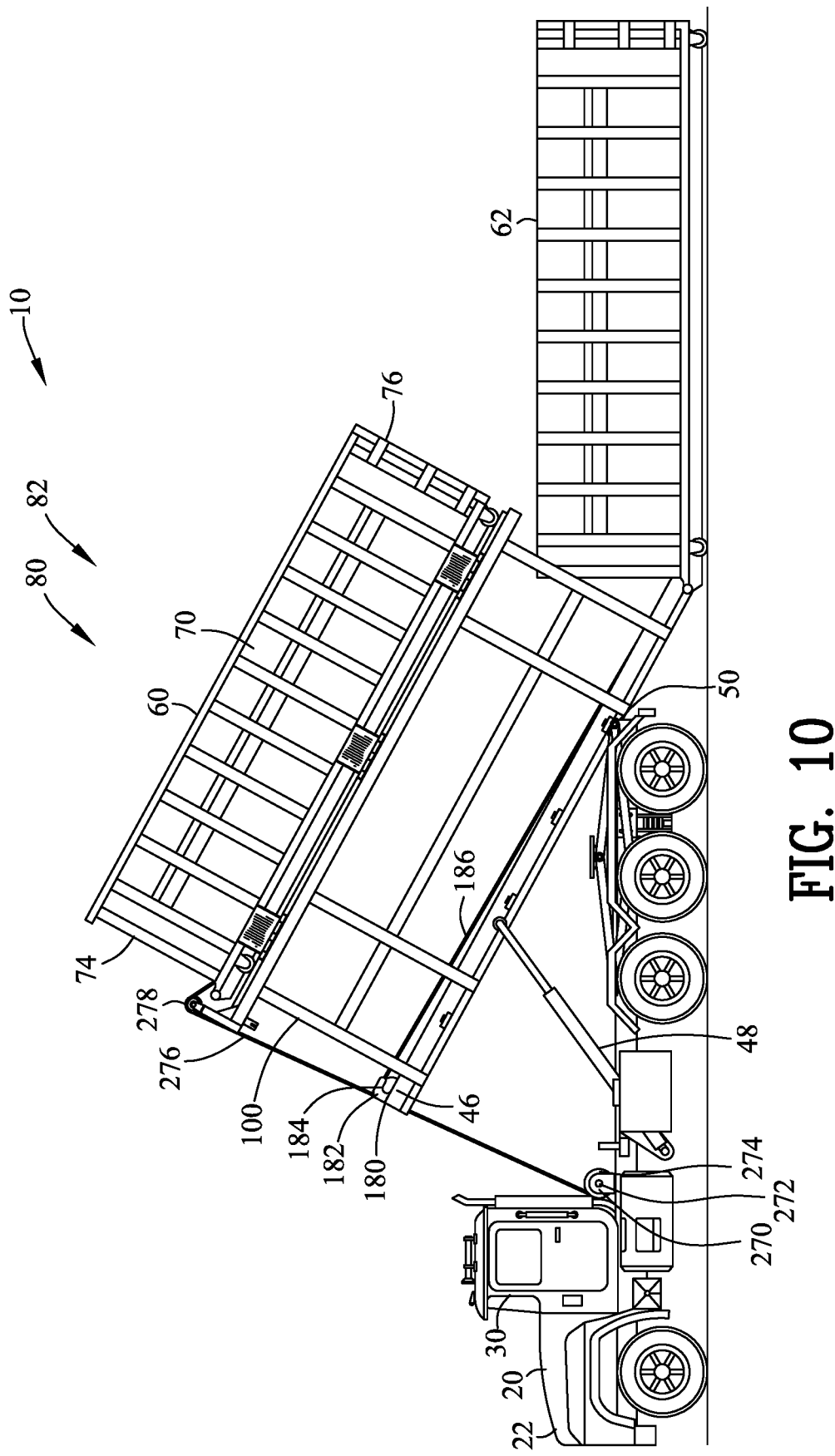
FIG. 10 is a view similar to FIG. 1 illustrating the dumpster handling device being pivoted away from the vehicle and a lower hoist coupled to a second dumpster.
Figure 11:
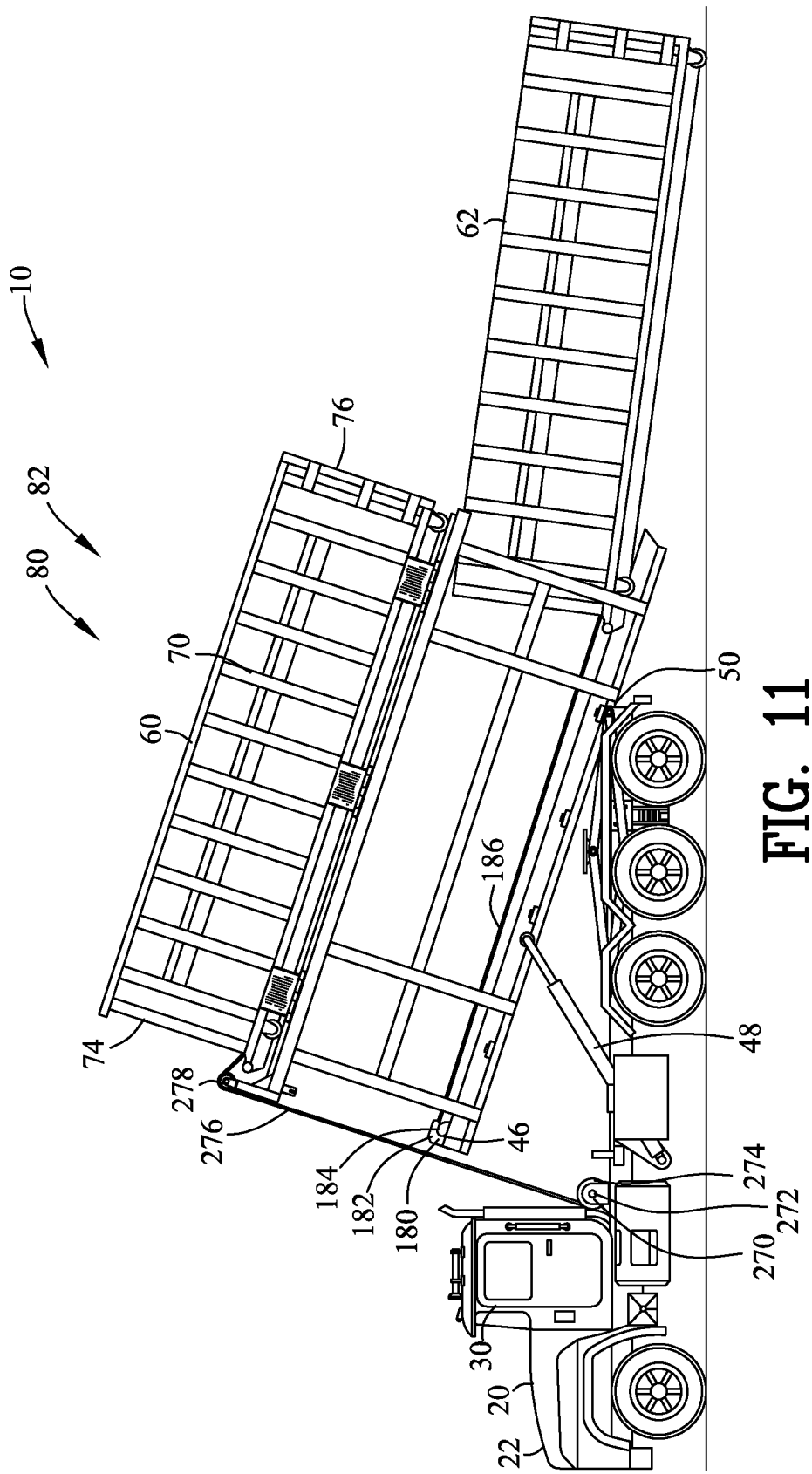
FIG. 11 is a view similar to FIG. 10 illustrating the lower hoist positioning the second dumpster within the lower dumpster holding channel.
Figure 12:
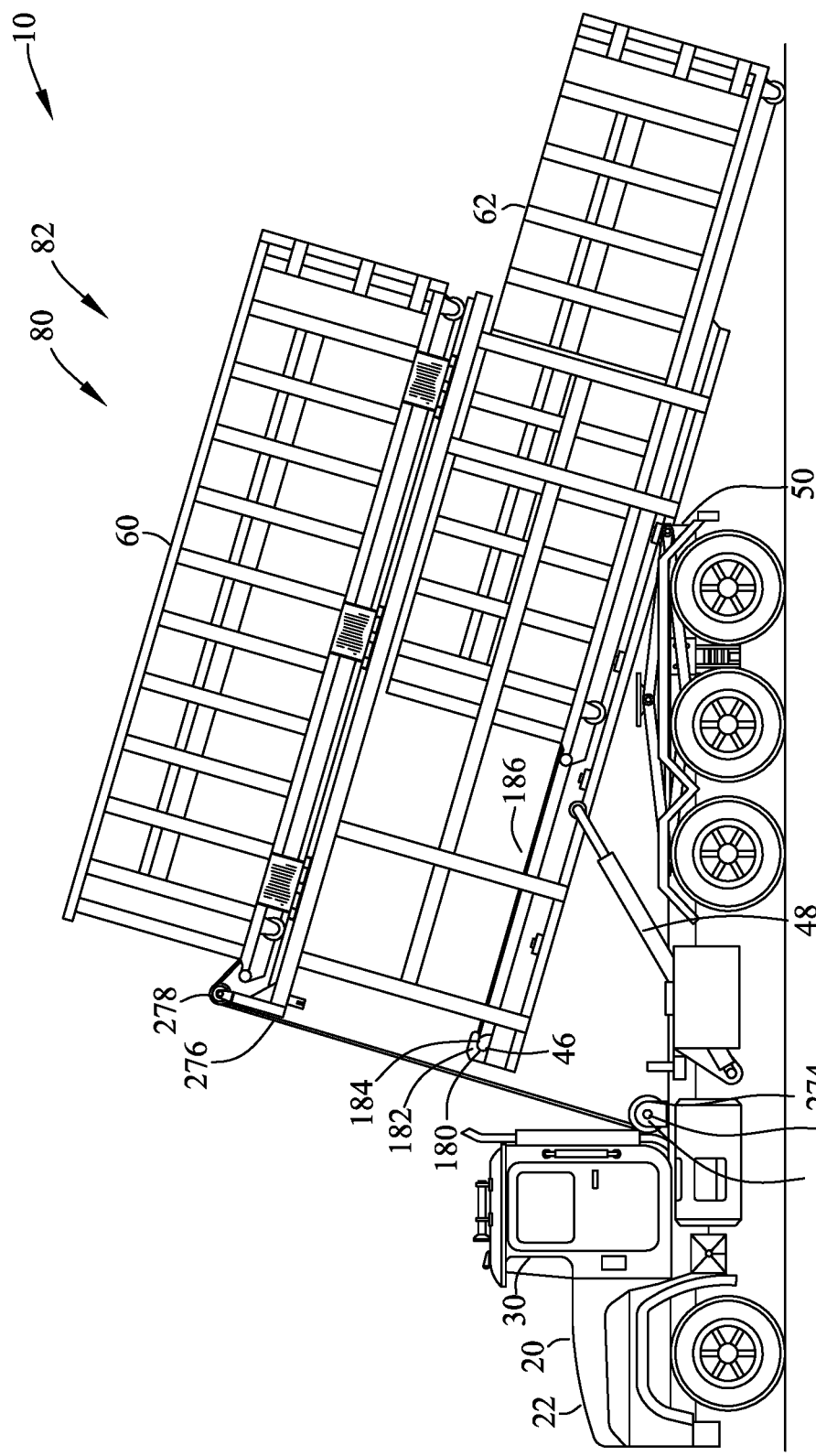
FIG. 12 is a view similar to FIG. 11 illustrating the lower hoist further positioning the second dumpster within the lower dumpster holding channel.
Figure 13:
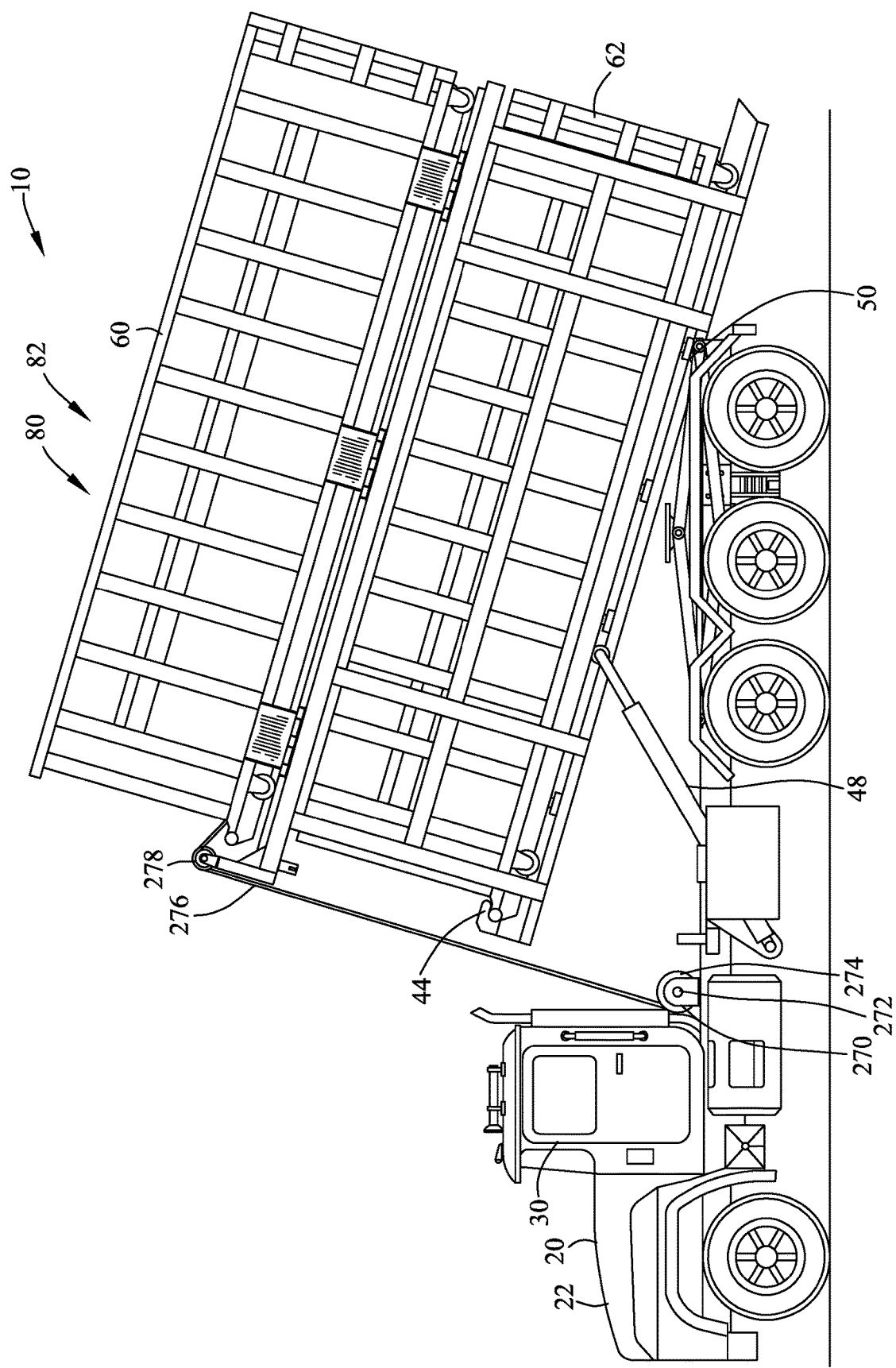
FIG. 13 is a view similar to FIG. 12 illustrating the lower hoist fully positioning the second dumpster within the lower dumpster holding channel.

As shown in FIGS. 8 and 9, the first dumpster 60 is next positioned in the upper dumpster holding channel 154. More specifically, upon lowering the first scissor jack 162 and the second scissor jack 164 the first dumpster 60 rests on the first upper support beam 150 and the second upper support beam 152. The first dumpster 60 is guided while in the upper dumpster holding channel 154 with a first guide arm 220 and a second guide arm 250. Thereafter, as shown in FIG. 10, the lower dumpster holding channel 140, the upper dumpster holding channel 154 and the first dumpster 60 are pivoted relative to the rear chassis 32.

As shown in FIGS. 10-13, the second dumpster 62 is positioned into the lower dumpster holding channel 140. More specifically, the lower cable is coupled to the second dumpster 62. Thereafter, the lower hoist motor 182 rotates the lower spool 184 and slides the second dumpster 62 into the lower dumpster holding channel 140. As shown in FIGS. 10-13, during the positioning of the second dumpster 62 within the lower dumpster holding channel 140, it may be necessary to reduce the angle between the rear chassis 32 and the lower support beam 90 for avoiding contact between the second dumpster 62 and the first upper support beam 150 and the second upper support beam 152.

Figure 14:
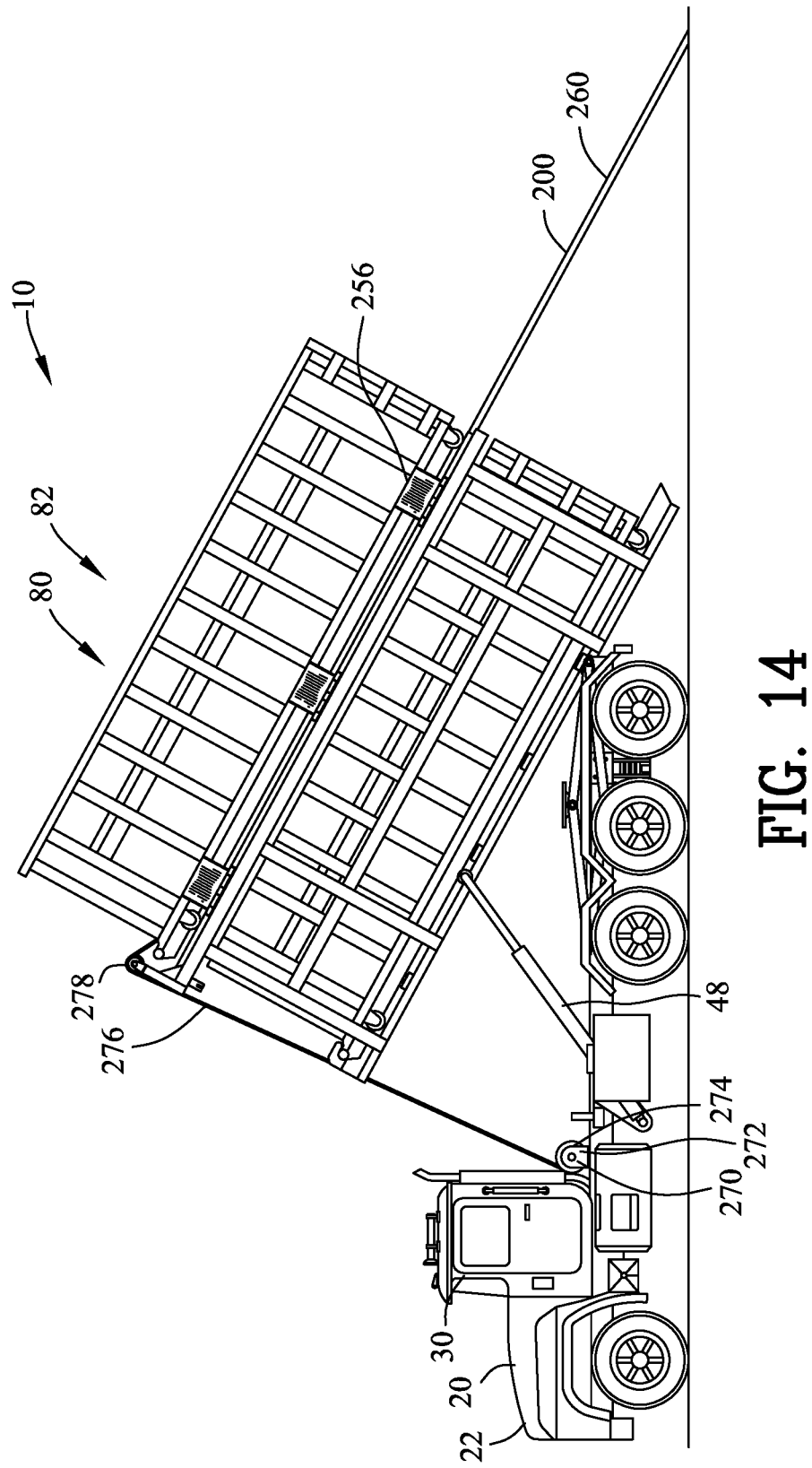
FIG. 14 is a view similar to FIG. 13 illustrating a first telescoping support beam displaced from a first upper support beam and a second telescoping support beam displaced from a second upper support beam for defining an angled dumpster displacement channel.
Figure 37:
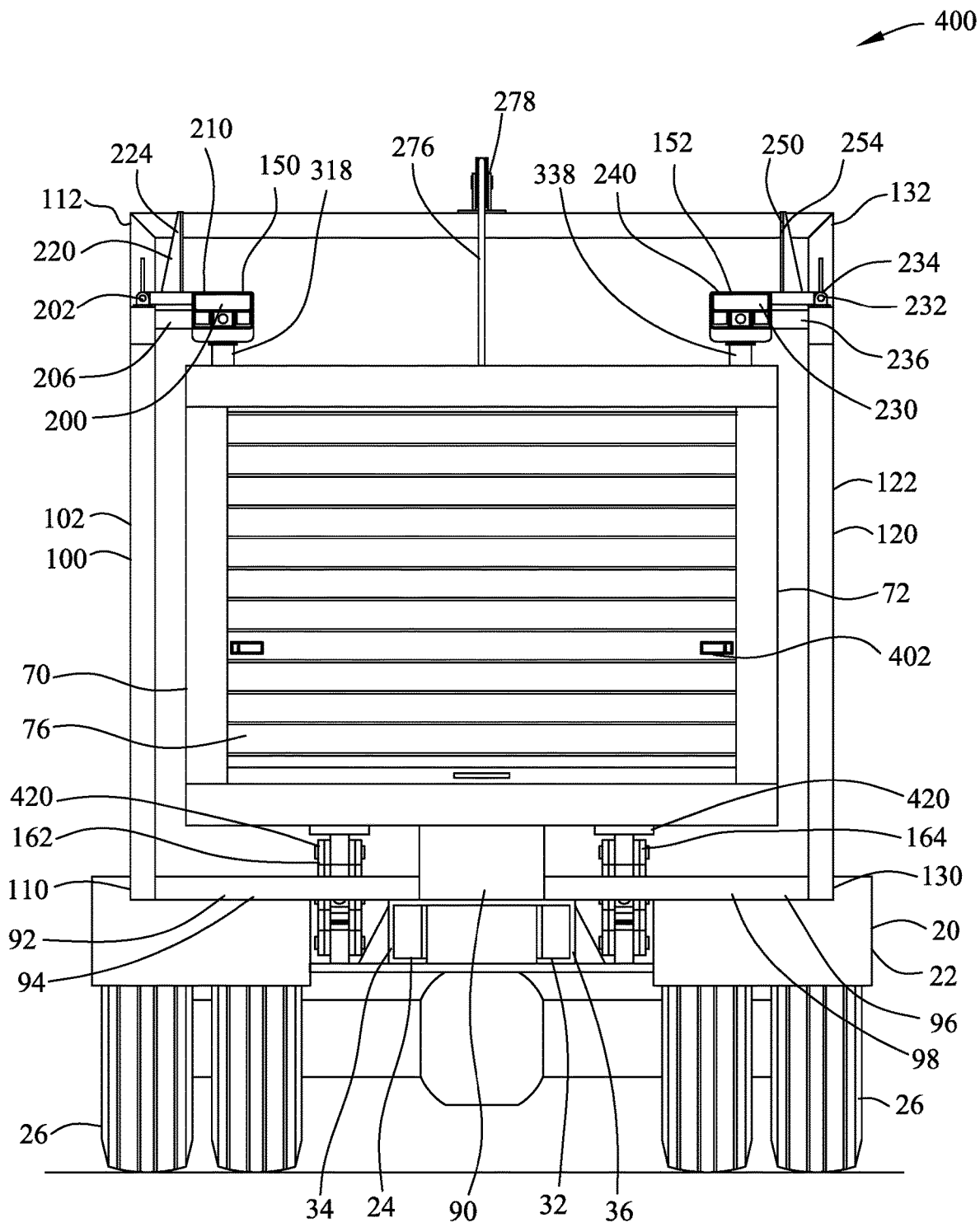
FIG. 37 is an enlarged right side view of FIG. 35.
Figure 38:
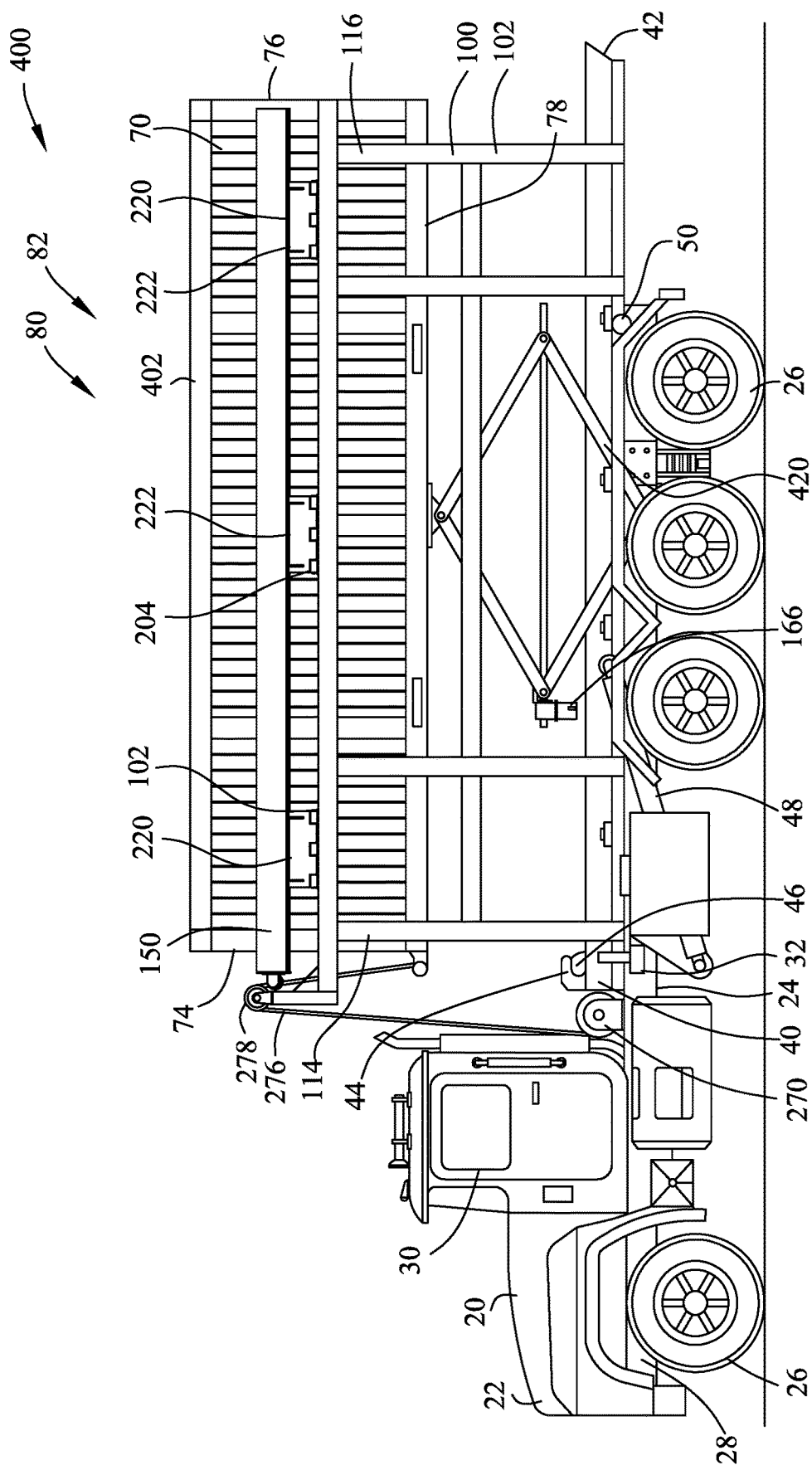
FIG. 38 is a view similar to FIG. 35 illustrating the first object being elevated from a rear chassis of a vehicle.
Figure 39:
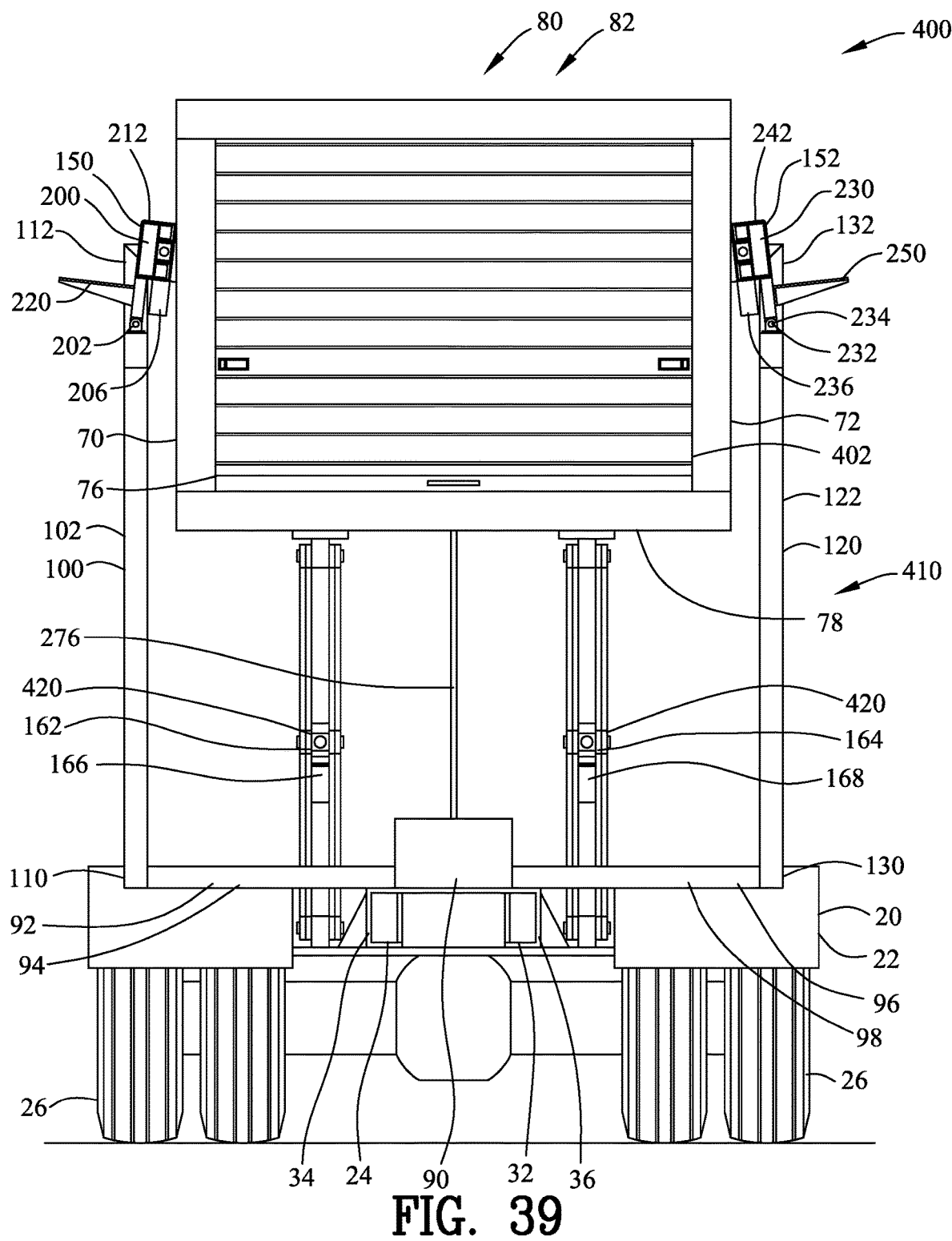
FIG. 39 is an enlarged right side view of FIG. 38.
Figure 40:
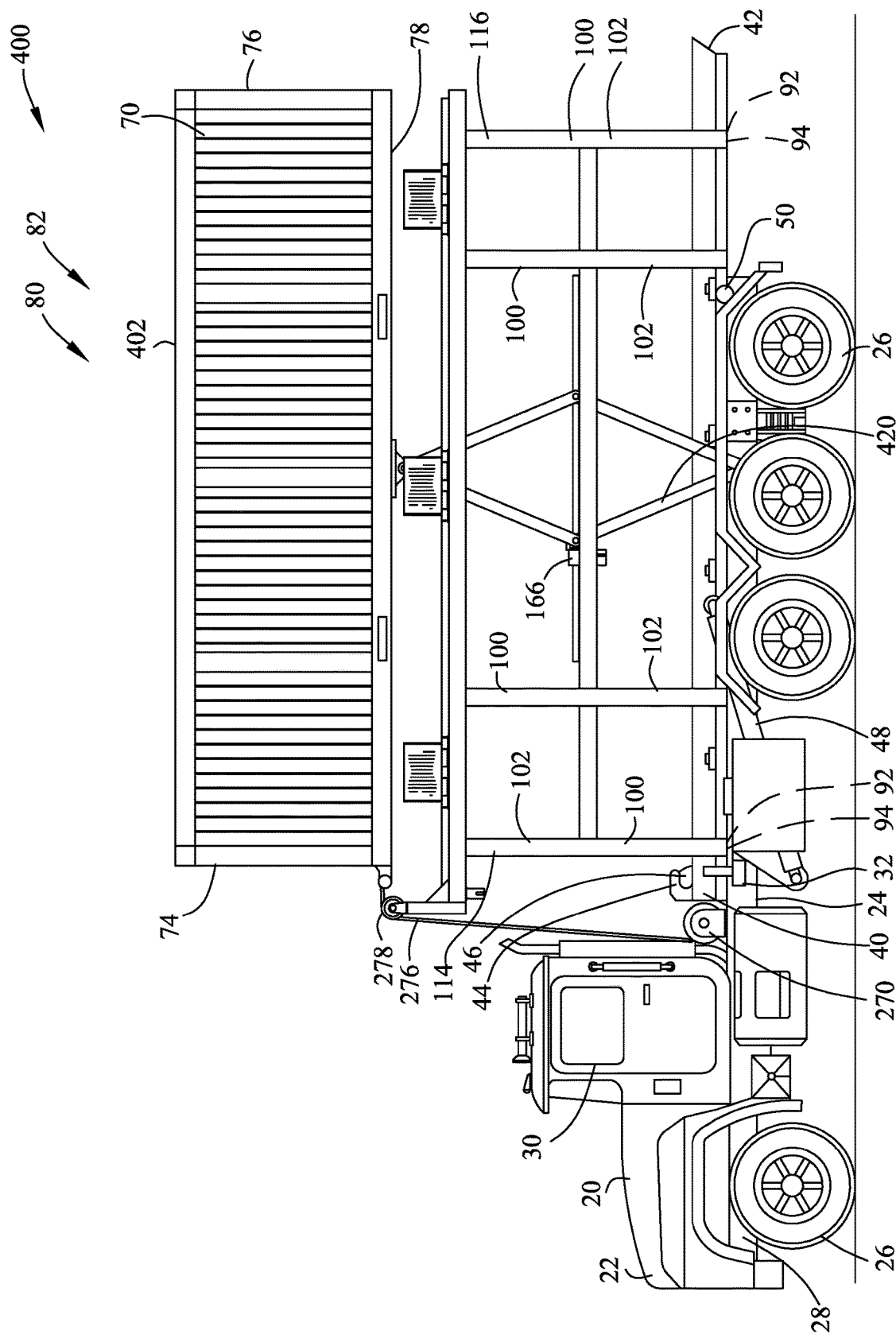
FIG. 40 is a view similar to FIG. 38 illustrating the first object being further elevated from the rear chassis of the vehicle.
Figure 41:
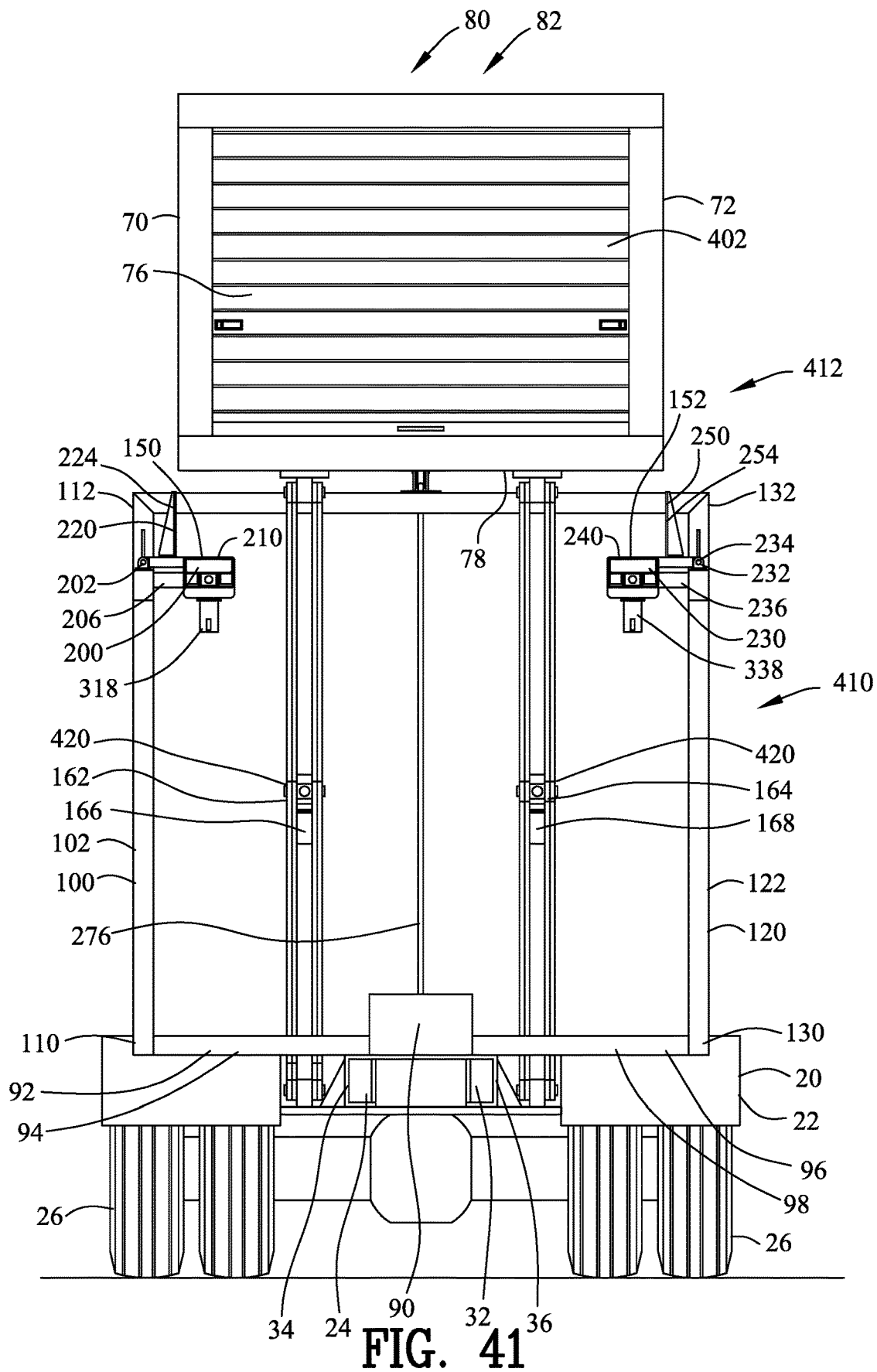
FIG. 41 is an enlarged right side view of FIG. 40.

FIG. 14 illustrates the step of telescoping the first telescoping support beam 200 and the second telescoping support beam 230 from the first upper support beam 150 and the second upper support beam 152 respectively. More specifically the step includes the first threaded bar 314 is rotated within the first upper support beam 150 for displacing the first telescoping support beam 200. The second threaded bar 334 is rotated within the second upper support beam 152 for displacing the second telescoping support beam 230. The first telescoping support beam 200 is rolled within the first upper support beam 150 with a first plurality of wheels 350. The second telescoping support beam 230 is rolled within the second upper support beam 152 with a second plurality of wheels 352. Thereafter, the angled dumpster displacement channel 260 is defined by the first telescoping support beam 200 extending from the first upper support beam 150 and the second telescoping support beam 230 extending from the second upper support beam 152.

Thereafter, as shown in FIGS. 14-16, the first dumpster 60 is lowered from the upper dumpster holding channel 154 and along the angled dumpster displacement channel 260 for positioning the first dumpster 60 on the ground. Once the first dumpster 60 is completely supported by the ground, the upper cable 276 is disengaged from the first dumpster 60.

As shown in FIGS. 17-18, the first telescoping support beam 200 and the second telescoping support beam 230 are retracted into the first upper support beam 150 and the second upper support beam 152 respectively. The lower dumpster holding channel 140, the upper dumpster holding channel 154 and the second dumpster 62 are pivoted relative to the rear chassis 32.

Typically, the second dumpster 62 is loaded with debris at a construction site. If the second dumpster 62 becomes full and additional debris must be removed from the site, the first dumpster 60 must be delivered to the construction site. Many times, the construction site has very little available area for unloading the first dumpster 60 and thereafter loading the second dumpster 62. The dumpster handling device 10 is most beneficial where there is limited area for the vehicle 22 to maneuver and where there is limited area for unloading the first dumpster 60 and thereafter loading the second dumpster 62. As illustrated in FIGS. 1-18, the vehicle 20 is positioned adjacent to and aligned with the filled second dumpster 62. The empty first dumpster 60 is elevated into the upper dumpster holding channel 154. Thereafter and without having to move the vehicle 20, the filled second dumpster 62 is positioned into the lower dumpster holding channel 140. Thereafter and again without having to move the vehicle 20, the empty first dumpster 60 is lowered to the ground along the angled dumpster displacement channel 260. The first dumpster 60 and the second dumpster 62 were transitioned from and to the vehicle 20 respectively without having to move the vehicle 20. The ability to transition the first dumpster 60 and the second dumpster 62 from and to the vehicle 20 respectively saves time in the transition and further permits the operation in a very limited area.

FIGS. 35-69 are various views of an object handling device 400 and method coupling to a vehicle 20 for handling a first object 402 and a second object 404. The structure and method of the object handling device 400 are substantially equivalent to the dumpster handling device 10 and method as set forth above. The equivalent structure and method between the object handling device 400 as shown in FIGS. 35-69 and the dumpster handling device 10 and method as shown in FIGS. 1-34 share common reference numerals.

The first object 402 and the second object 404 may include but not limited to a container, a storage container, a solids container, a liquid container, a gas contain, a vehicle, a billboard, a dwelling, a framing, a structure, a building structure, a pallet, a pallet supporting a item, and or other items. Preferably the vehicle 20 is a truck 22 having a chassis 24 supporting a plurality of wheels 26. The chassis 24 includes a front chassis 28 supporting a drive cab 30 and a rear chassis 32. A first roll frame 34 and a second roll frame 36 are pivoting coupled to the rear chassis 32. The first roll frame 34 and a second roll frame 36 extend from a proximal end 40 to a distal end 42. A retaining hook 44 is coupled between the first roll frame 34 and a second roll frame 36 and adjacent to the proximal end 40. A lower winch 46 is coupled between first roll frame 34 and a second roll frame 36 and adjacent to the proximal end 40 for pulling the first object 402 and the second object 404 onto the first roll frame 34 and the second roll frame 36. A beam lift 48 pivots the first roll frame 34 and a second roll frame 36 on a frame pivot 50 coupled to the rear chassis 32. The beam lift 48 is shown as a telescoping hydraulic cylinder.

The first object 402 and the second object 404 each have a first side 70, a second side 72, a front 74, a rear 76 and a bottom 78. Objects 82 may be placed into the first object 402 and the second object 404. The object handling device 400 comprises a lower support beam 90 coupled to the rear chassis 32 for supporting the first object 402. The lower support beam 90 has a first side beam 92 and a second side beam 96. Preferably, the first side beam 92 and the second side beam 96 include a plurality of first side beams 94 and a plurality of second side beams 98 respectively.

A first side frame 100 is coupled to the first side beam 92 and extends vertically from the first side beam 92. More specifically, the first side frame 100 may include a plurality of vertical frame members 102. The first side frame 100 defines a lower end 110, an upper end 112, a front end 114 and a rear end 116. Similarly, a second side frame 120 is coupled to the second side beam 96 and extends vertically from the second side beam 96. More specifically, the second side frame 120 may include a plurality of vertical flame members 122. The second side frame 120 defines a lower end 130, an upper end 132, a front end 134 and a rear end 136. The lower support beam 90, the first side frame 100 and the second side frame 120 define a lower object holding channel 410.

A first upper support beam 150 is coupled to the upper end 112 of the first side frame 100. A second upper support beam 152 is coupled to the upper end 132 of the second side frame 120. The first upper support beam 150 and the second upper support beam 152 define an upper object holding channel 412.

An object lift 420 is coupled to the rear chassis 32 for vertically lifting the first object 402 from the lower object holding channel 410 to the upper object holding channel 412. The first upper support beam 150 and the second upper support beam 152 support the first object 402 in the upper object holding channel 412. More specifically, the object lift 420 may include a first scissor jack 162 and a second scissor jack 164 coupled between the lower support beam 90 and the rear chassis 32. The first scissor jack 162 and a second scissor jack 164 may be operated by a first jack electric motor 166 and a second jack electric motor 168.

The frame pivot 50 pivotably couples the lower support beam 90 to the rear chassis 32. The telescoping hydraulic cylinder 48 is coupled between the lower support beam 90 and the rear chassis 32 for pivoting the lower support beam 90 and the first object 402 relative to the rear chassis 32. A lower hoist 180 links the lower support beam 90 with the second object 404 for positioning the second object 404 within the lower object holding channel 410. The lower hoist 180 may include a lower hoist motor 182 operating a lower spool 184 and a lower cable 186.

A first telescoping support beam 200 extends from the first upper support beam 150. A second telescoping support beam 230 extends from second upper support beam 152. The first telescoping support beam 200 and the second telescoping support beam 230 define an angled object displacement channel 414. An upper hoist 270 links with the first object 402 for displacing the first object 402 along the angled object displacement channel 414. The upper hoist 270 may include an upper hoist motor 272 operating an upper spool 274 and an upper cable 276. The upper cable 276 may travel over an upper pulley 278. The first telescoping support beam 200 and the second telescoping support beam 230 may include a general U-shaped channel 422 for maintaining either the first object 402 or the second object 404 within the angled object displacement channel 414.

A first hinge 202 pivotably couples the first upper support beam 150 to the upper end 112 of the first side frame 100. Preferably, first hinge 202 includes a first plurality of hinges 204. A first hinge stop 206 is coupled to the first upper support beam 150 and engages the upper end 112 of the first side frame 100 for positioning the first upper support beam 150 in a general horizontal position 210 for supporting the first object 402. The first hinge 202 positions the first upper support beam 150 in a general vertical position 212 during vertically lifting the first object 402 from the lower object holding channel 410 to the upper object holding channel 412 and when the first upper support beam 150 engages the first object 402.

A second hinge 232 pivotably couples the second upper support beam 230 to the upper end 132 of the second side frame 120. Preferably, second hinge 232 includes a second plurality of hinges 234. A second hinge stop 236 is coupled to the second upper support beam 152 and engages the upper end 132 of the second side frame 120 for positioning the second upper support beam 152 in a general horizontal position 240 for supporting the first object 402. The second hinge 232 positions the second upper support beam 152 in a general vertical position 242 during vertically lifting the first object 402 from the lower object holding channel 410 to the upper object holding channel 412 and when the second upper support beam 152 engages the first object 402.

A first guide arm 220 is coupled to the first upper support beam 150. Preferably, the first guide arm 220 includes a plurality of first guide arms 222. The first guide arm 220 has a general vertical position 224 when the first upper support beam 150 is in the general horizontal position 210. A second guide arm 250 is coupled to the second upper support beam 152. Preferably, the second guide arm 250 includes a plurality of first guide arms 252. The second guide arm 250 has a general vertical position 254 when the second upper support beam 152 is in the general horizontal position 240. The first guide arm 220 and the second guide arm 250 define a guiding channel 256 for guiding the first object 402 in the upper object holding channel 412.

The first upper support beam 150 includes a proximal end 280 and a distal end 282. A first beam cavity 284 extends within the first upper support beam 150 and to the distal end 282 of the first upper support beam 150. The first telescoping support beam 200 slidably engages within the first beam cavity 284. Similarly, the second upper support beam 152 includes a proximal end 290 and a distal end 292. A second beam cavity 294 extends within the second upper support beam 152 and to the distal end 292 of the second upper support beam 152. The second telescoping support beam 230 slidably engages within the second beam cavity 294.

A first beam track 300 is coupled to the first upper support beam 150 and extends into the first beam cavity 284. More specifically, the first beam track 300 may include a primary first rib 302 and a secondary first rib 304 defining a first track channel 306. A first track block 310 is coupled to the first telescoping support beam 200 and engages within the first beam track 300 for guiding the first telescoping support beam 200 within the first beam cavity 284. Similarly, a second beam track 320 is coupled to the second upper support beam 152 and extends into the second beam cavity 294. More specifically, the second beam track 320 may include a primary second rib 322 and a secondary second rib 324 defining a second track channel 326. A second track block 330 is coupled to the second telescoping support beam 230 and engages within the second beam track 320 for guiding the second telescoping support beam 230 within the second beam cavity 294.

A first threaded aperture 312 is within the first track block 310. A first threaded bar 314 is positioned within the first beam track 300 and threadably engages within the first threaded aperture 312. A first rotational force 316 is coupled to the first threaded bar 314 for rotating the first threaded bar 314 and displaces the first track block 310 relative to the first beam track 300 and displacing the first telescoping support beam 200 relative to the first upper support beam 150. A second threaded aperture 332 is within the second track block 330. A second threaded bar 334 is positioned within the second beam track 320 and threadably engages within the second threaded aperture 332. A second rotational force 336 is coupled to the second threaded bar 334 for rotating the second threaded bar 334 and displacing the second track block 330 relative to the second beam track 320 and displacing the second telescoping support beam 230 relative to the second upper support beam 152.

A first plurality of wheels 350 are coupled to the first upper support beam 150 and are positioned within the first beam cavity 284. The first plurality of wheels 350 support the first telescoping support beam 200 within the first beam cavity 284 and rotate during displacement of the first telescoping support beam 200 relative to the first upper support beam 150. Similarly, a second plurality of wheels 352 are coupled to the second upper support beam 152 and are positioned within the second beam cavity 294. The second plurality of wheels 352 support the second telescoping support beam 230 within the second beam cavity 294 and rotate during displacement of the second telescoping support beam 230 relative to the second upper support beam 152.

The first rotational force 316 may include a first electric motor 318 coupled to the proximal end 280 of the first upper support beam 150. The second rotational force 336 may include a second electric motor 338 coupled to the proximal end 290 of the second upper support beam 152. The first threaded bar 314 and the second threaded bar 334 may be secured to the first upper support beam 150 and the second upper support beam 152 respectively, by wheel bearings 354.

FIGS. 35-53 illustrate the method for handling a first object 402 and a second object 404. The method comprises the steps of lifting the first object 402 from the lower object holding channel 410 as shown in FIGS. 35-43. As the first object 402 is lifted from the lower object holding channel 410, the upper spool 274 is preferably rotated to permit additional upper cable 276 to released from the upper spool 274 while preventing the first object 402 from being displaced from the upper object holding channel 412.

As the first scissor jack 162 and the second scissor jack 164 lifts the first object 402, the first object 402 makes contact with the first upper support beam 150 and the second upper support beam 152 and causes the first upper support beam 150 and the second upper support beam 152 to pivot from the general horizontal position 210 and 240 respectively to a general vertical position 212 and 242 respectively. After the first scissor jack 162 and the second scissor jack 164 lifts the first object 402 above the first upper support beam 150 and the second upper support beam 152, the first upper support beam 150 and the second upper support beam 152 pivot by gravity from general vertical position 212 and 242 respectively to the general horizontal position 210 and 240 respectively.

Figure 42:
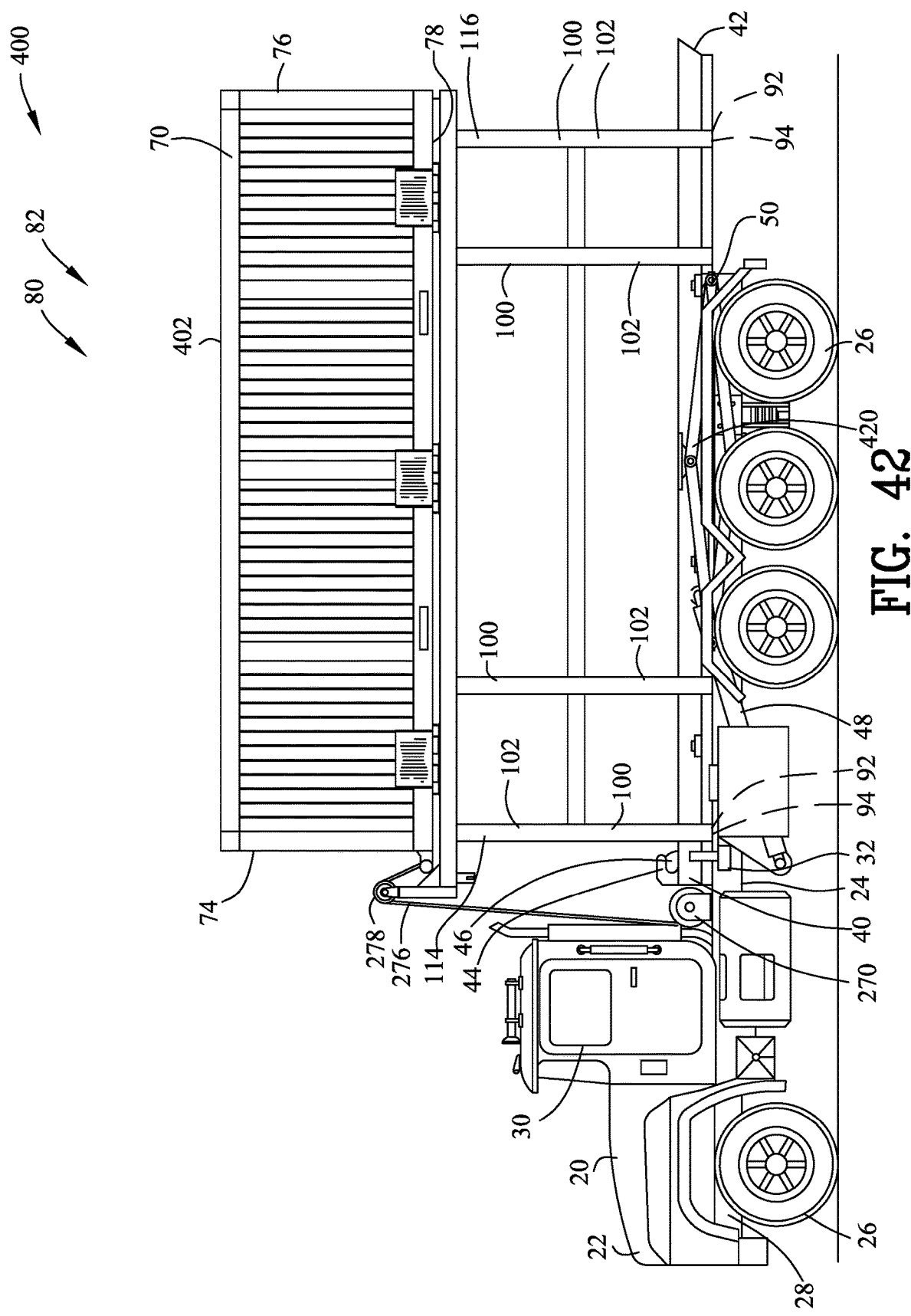
FIG. 42 is a view similar to FIG. 40 illustrating the first object being supported in an upper object holding channel.
Figure 43:
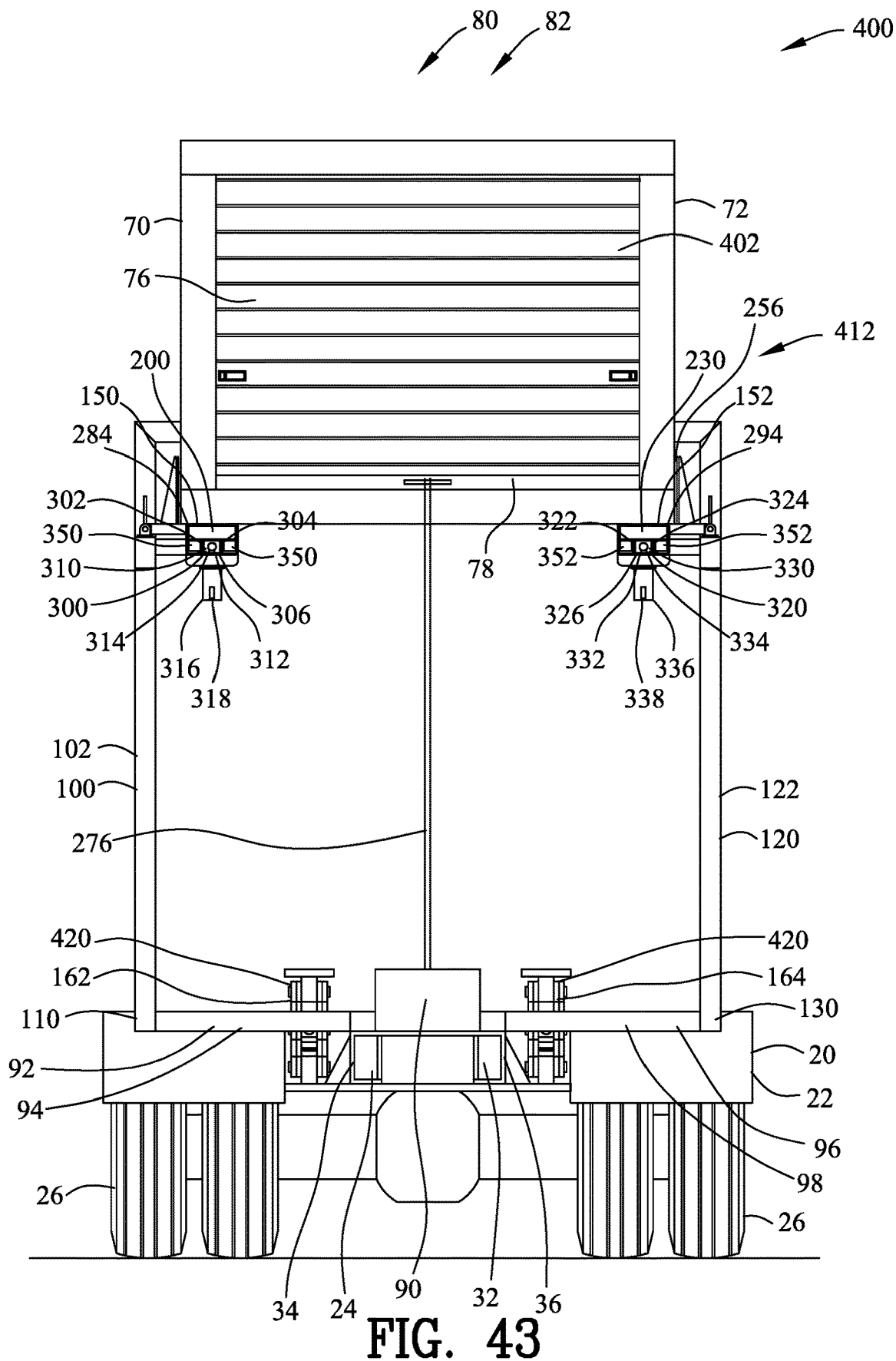
FIG. 43 is an enlarged right side view of FIG. 42.
Figure 44:
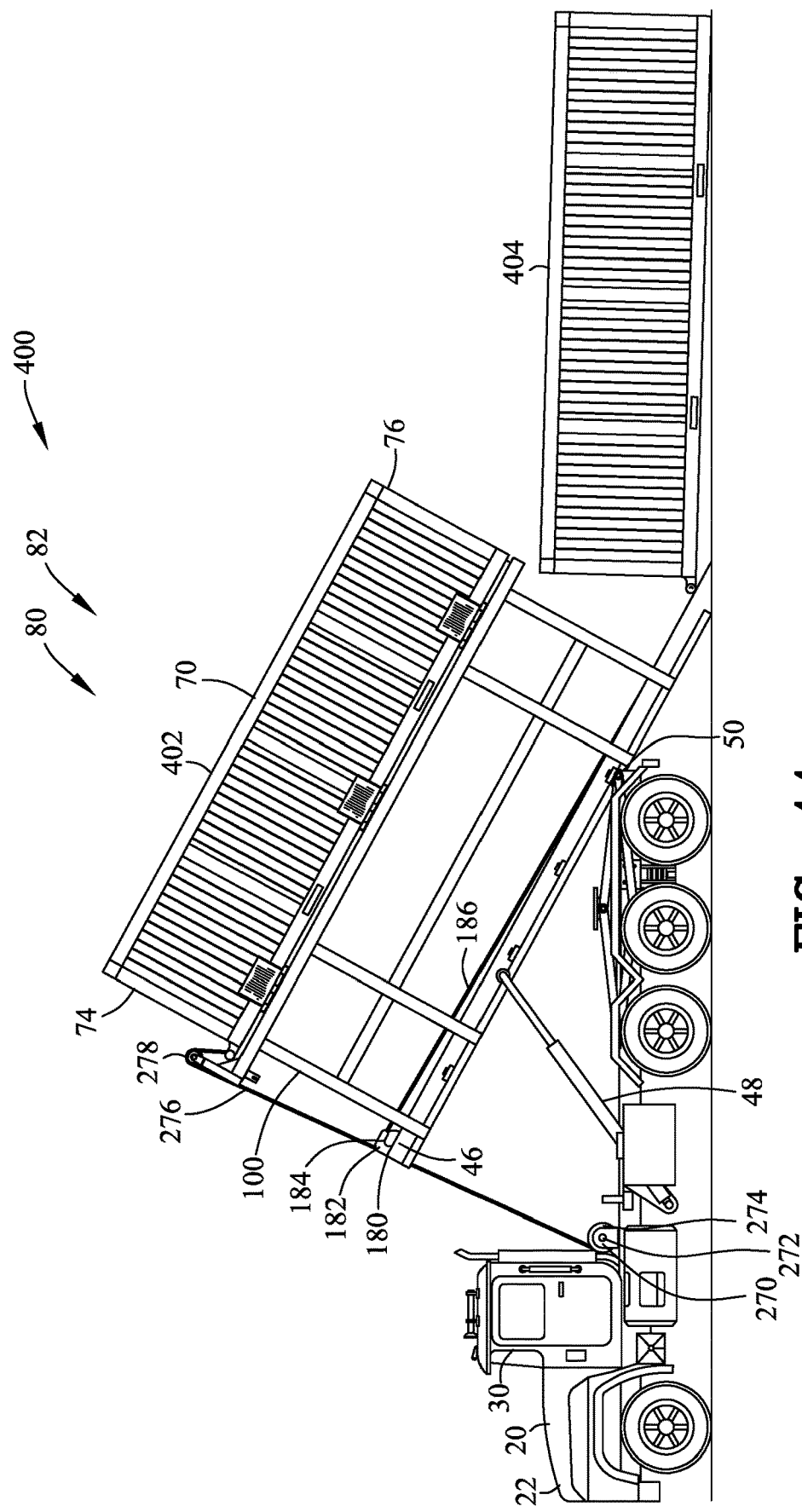
FIG. 44 is a view similar to FIG. 35 illustrating the object handling device being pivoted away from the vehicle and a lower hoist coupled to a second object.
Figure 45:
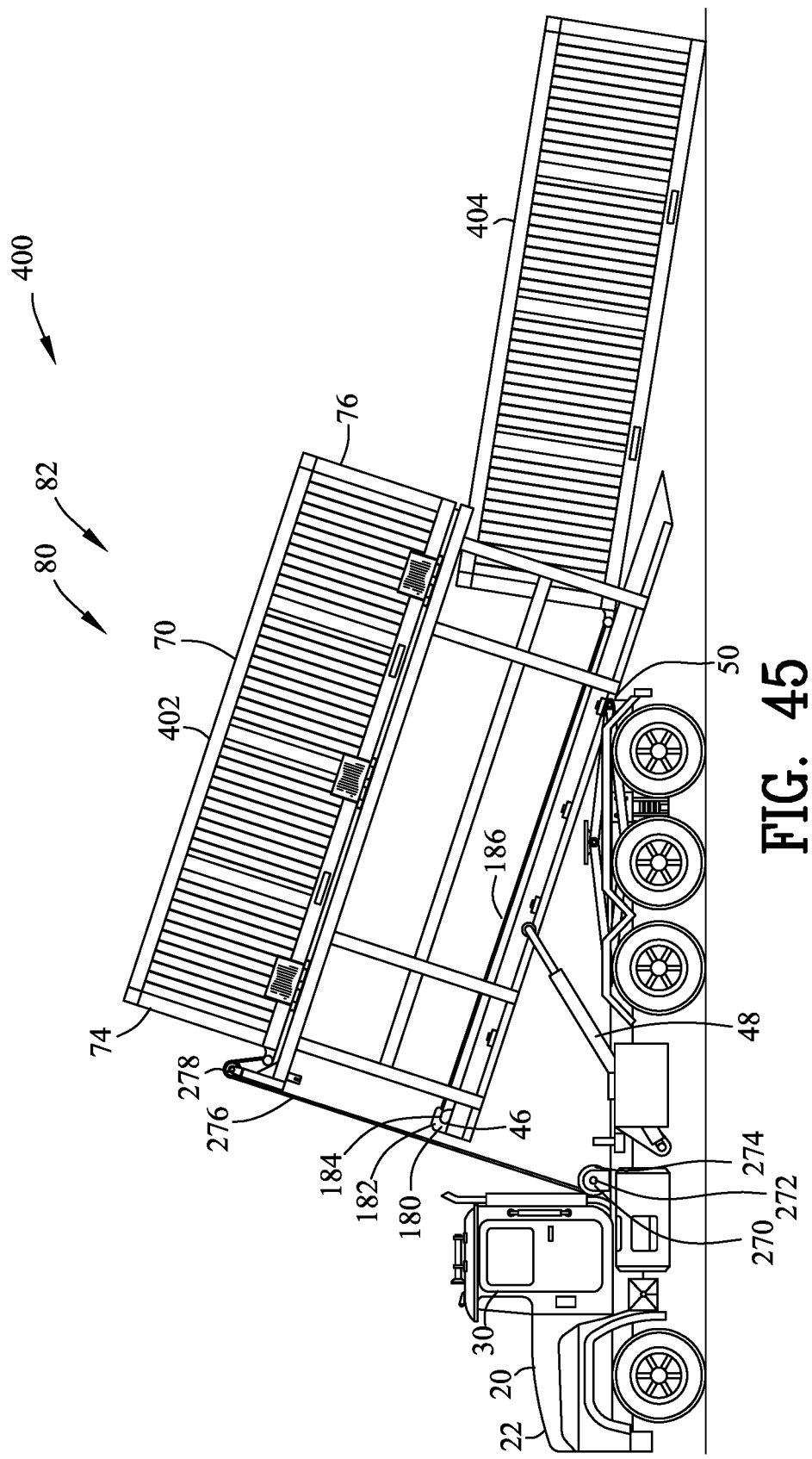
FIG. 45 is a view similar to FIG. 44 illustrating the lower hoist positioning the second object within the lower object holding channel.
Figure 46:
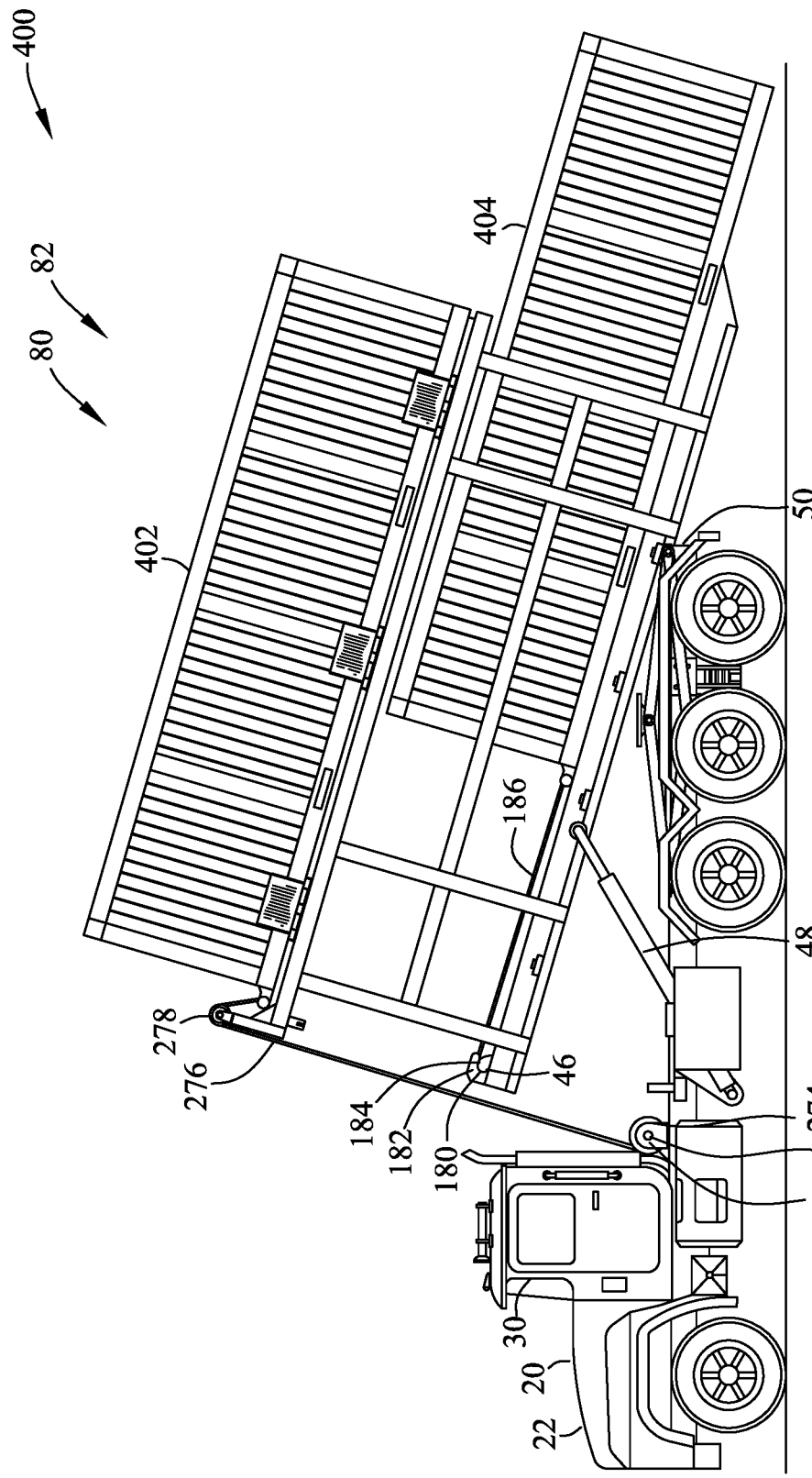
FIG. 46 is a view similar to FIG. 45 illustrating the lower hoist further positioning the second object within the lower object holding channel.
Figure 47:
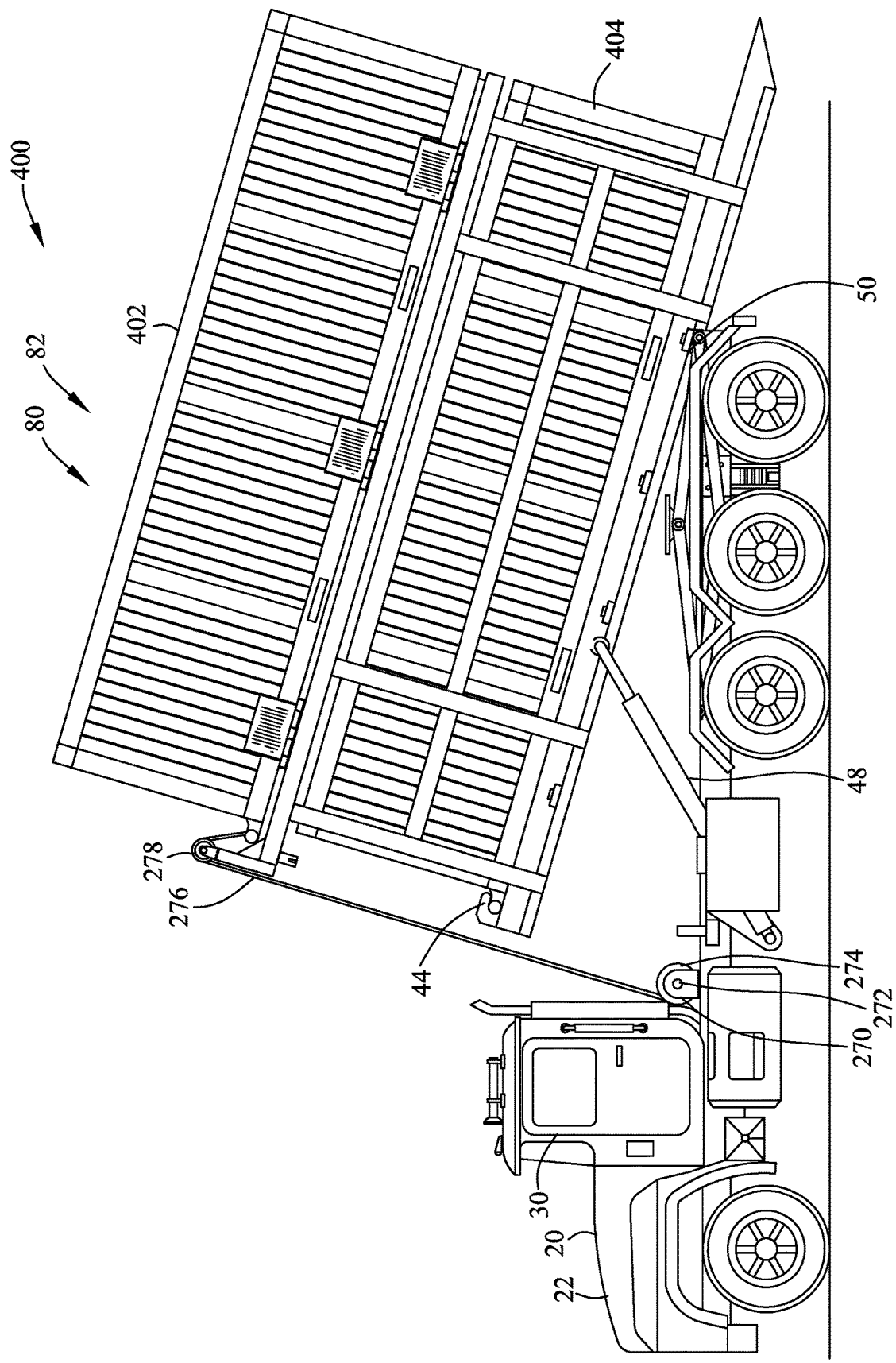
FIG. 47 is a view similar to FIG. 46 illustrating the lower hoist fully positioning the second object within the lower object holding channel.

As shown in FIGS. 42 and 43, the first object 402 is next positioned in the upper object holding channel 412. More specifically, upon lowering the first scissor jack 162 and the second scissor jack 164 the first object 402 rests on the first upper support beam 150 and the second upper support beam 152. The first object 402 is guided while in the upper object holding channel 412 with a first guide arm 220 and a second guide arm 250. Thereafter, as shown in FIG. 44, the lower object holding channel 410, the upper object holding channel 412 and the first object 402 are pivoted relative to the rear chassis 32.

As shown in FIGS. 44-47, the second object 404 is positioned into the lower object holding channel 410. More specifically, the lower cable is coupled to the second object 404. Thereafter, the lower hoist motor 182 rotates the lower spool 184 and slides the second object 404 into the lower object holding channel 410. As shown in FIGS. 44-47, during the positioning of the second object 404 within the lower object holding channel 410, it may be necessary to reduce the angle between the rear chassis 32 and the lower support beam 90 for avoiding contact between the second object 404 and the first upper support beam 150 and the second upper support beam 152.

Figure 48:
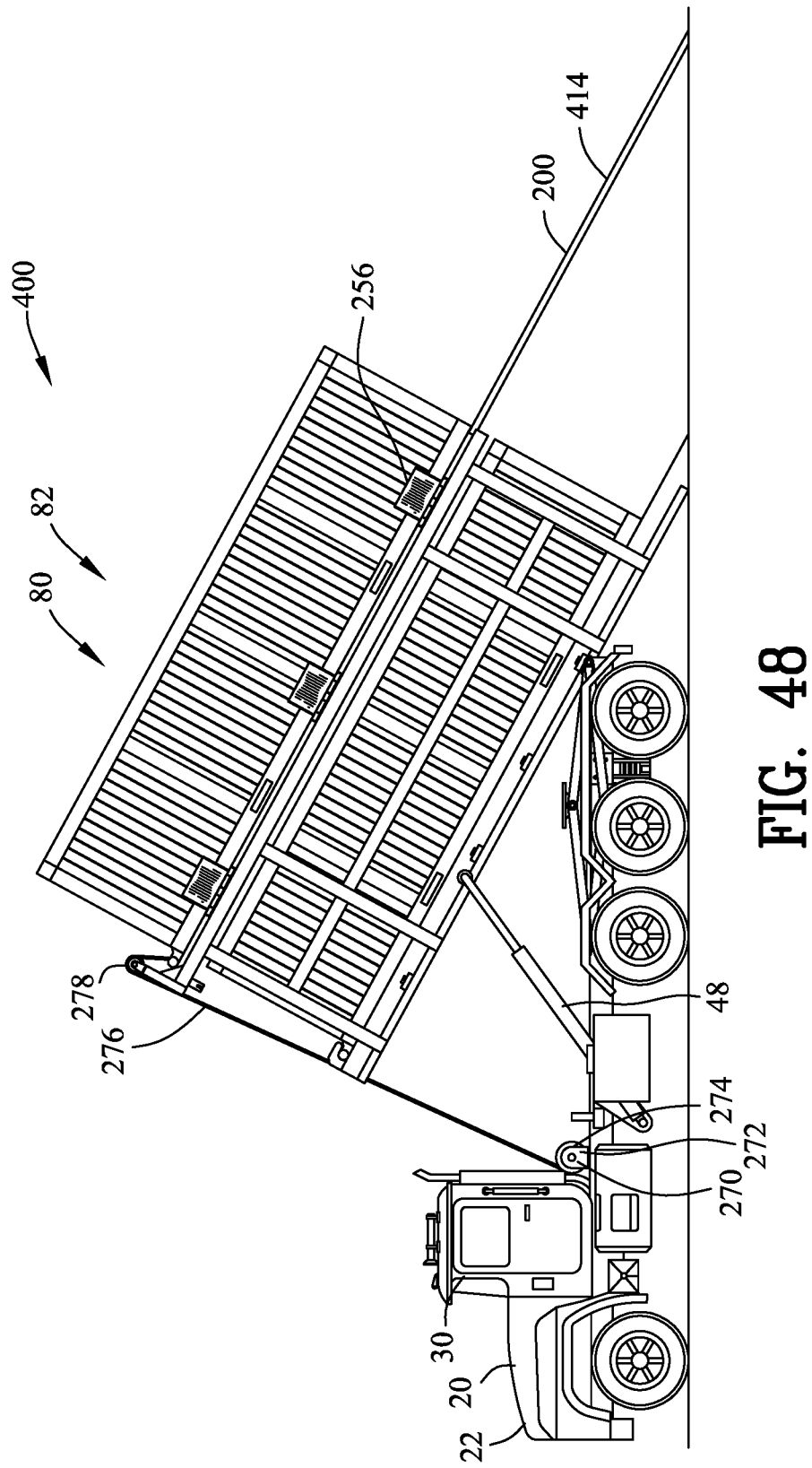
FIG. 48 is a view similar to FIG. 47 illustrating a first telescoping support beam displaced from a first upper support beam and a second telescoping support beam displaced from a second upper support beam for defining an angled object displacement channel.

FIG. 48 illustrates the step of telescoping the first telescoping support beam 200 and the second telescoping support beam 230 from the first upper support beam 150 and the second upper support beam 152 respectively. More specifically the step includes the first threaded bar 314 is rotated within the first upper support beam 150 for displacing the first telescoping support beam 200. The second threaded bar 334 is rotated within the second upper support beam 152 for displacing the second telescoping support beam 230. The first telescoping support beam 200 is rolled within the first upper support beam 150 with a first plurality of wheels 350. The second telescoping support beam 230 is rolled within the second upper support beam 152 with a second plurality of wheels 352. Thereafter, the angled object displacement channel 414 is defined by the first telescoping support beam 200 extending from the first upper support beam 150 and the second telescoping support beam 230 extending from the second upper support beam 152.

Thereafter, as shown in FIGS. 48-50, the first object 402 is lowered from the upper object holding channel 412 and along the angled object displacement channel 414 for positioning the first object 402 on the ground. Once the first object 402 is completely supported by the ground, the upper cable 276 is disengaged from the first object 402.

Figure 51:
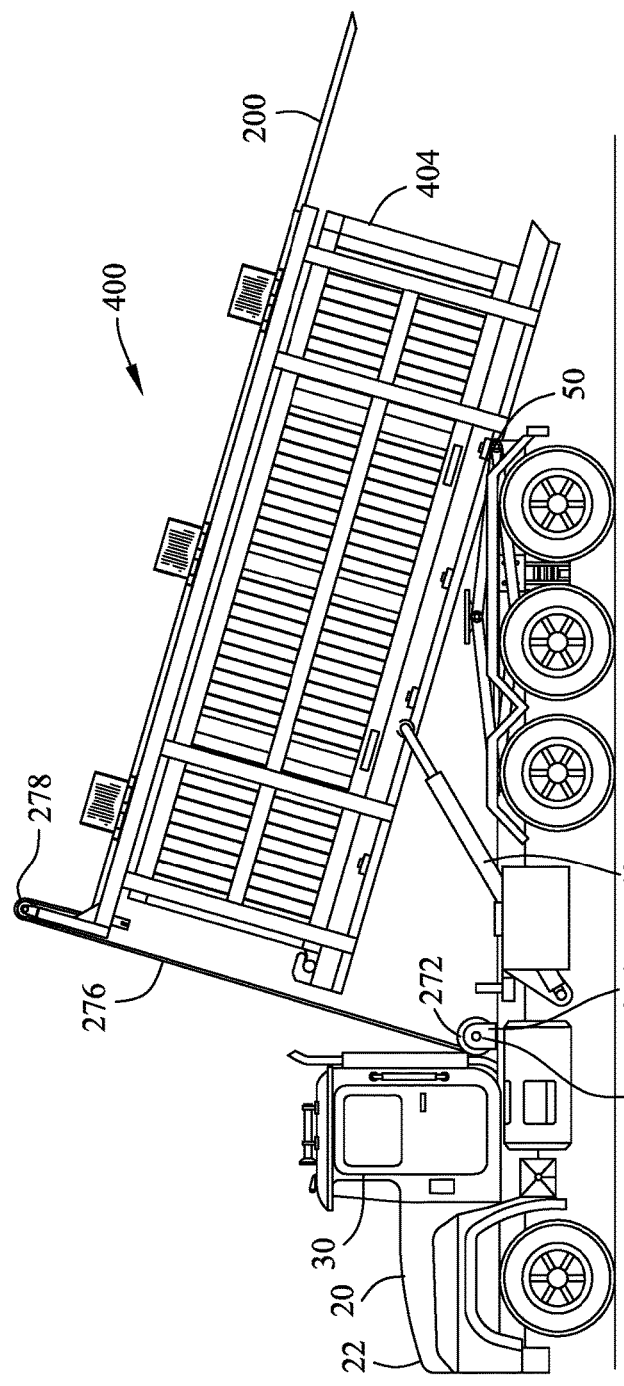
FIG. 51 is a view similar to FIG. 50 illustrating the object handling device being pivoted toward the vehicle and the first telescoping support beam displaced into the first upper support beam and the second telescoping support beam displaced into the second upper support beam.
Figure 52:
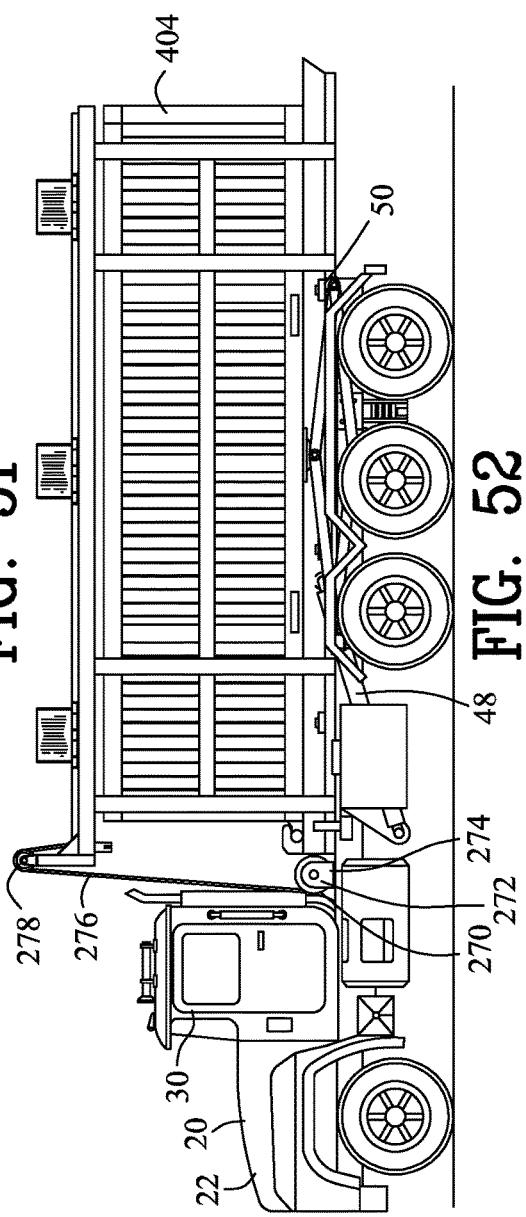
FIG. 52 is a view similar to FIG. 51 illustrating the object handling device being pivoted adjacent to the rear chassis of the vehicle.
Figure 53:
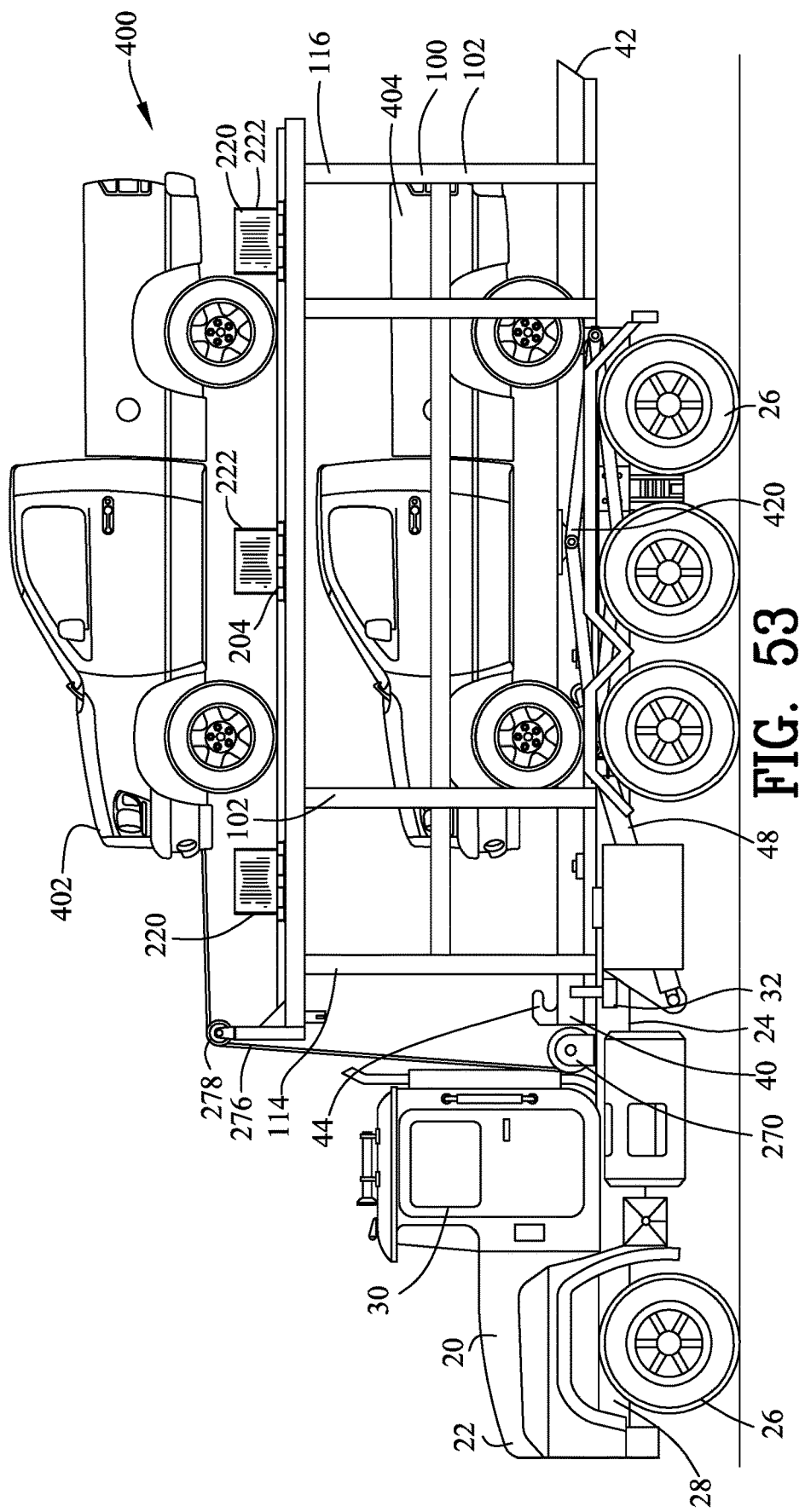
FIG. 53 is a view similar to FIG. 52 illustrating the object handling device supporting a first vehicle in the lower object holding channel and a second vehicle in the upper object holding channel.

As shown in FIGS. 51-52, the first telescoping support beam 200 and the second telescoping support beam 230 are retracted into the first upper support beam 150 and the second upper support beam 152 respectively. The lower object holding channel 410, the upper object holding channel 412 and the second object 404 are pivoted relative to the rear chassis 32.

Typically, the second object 404 is loaded at a site. If the second object 404 becomes full and or is in need of transportation from the site and the first object 402 can be delivered to the site. Many times, the site has very little available area for unloading the first object 402 and thereafter loading the second object 404. The object handling device 400 is most beneficial where there is limited area for the vehicle 22 to maneuver and where there is limited area for unloading the first object 402 and thereafter loading the second object 404. As illustrated in FIGS. 35-53, the vehicle 20 is positioned adjacent to and aligned with the second object 404. The first object 402 is elevated into the upper object holding channel 412. Thereafter and without having to move the vehicle 20, the second object 404 is positioned into the lower object holding channel 410. Thereafter and again without having to move the vehicle 20, the first object 402 is lowered to the ground along the angled object displacement channel 414. The first object 402 and the second object 404 were transitioned from and to the vehicle 20 respectively without having to move the vehicle 20. The ability to transition the first object 402 and the second object 404 from and to the vehicle 20 respectively saves time in the transition and further permits the operation in a very limited area.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An object handling device coupled to a vehicle for handling, a first object and a second object, the first object and the second object each having a first side, a second side, a front, a rear and a bottom, the vehicle having a chassis, the object handling device comprising:
   a lower support beam coupled to the chassis for supporting the first object;
   said lower support beam having a first side beam and a second side beam;
   a first side frame coupled to said first side beam and extending vertically from said first side beam;
   said first side frame defining a lower end, an upper end, a front end and a rear end;
   a second side frame coupled to said second side beam and extending vertically from the second side beam;
   said second side frame defining a lower end, an upper end, a front end and a rear end;
   said lower support beam, said first side frame and said second side frame defining a lower object holding channel;
   a first upper support beam coupled to said upper end of said first side frame;
   a second upper support beam coupled to said upper end of said second side frame;
   said first upper support beam and said second upper support beam defining an upper object holding channel;
   an object lift coupled to the chassis for vertically lifting the first object from said lower object holding channel to said upper object holding channel;
   said first upper support beam and said second upper support beam supporting the first object in said upper object holding channel;
   a pivot pivotably coupling said lower support beam to the chassis;

a beam lift coupled between said lower support beam and the chassis for pivoting said lower support beam and the first object relative to the chassis;

a lower hoist linking said lower support beam with the second object for positioning the second object within said lower object holding channel;

a first telescoping support beam extending from said first upper support beam;

a second telescoping support beam extending from nd upper support beam;

said first telescoping support beam and said second telescoping support beam defining an angled object displacement channel; and an upper hoist linking with the first object for displacing the first object along said angled object displacement channel.

2. The object handling device as set forth in claim 1, further including a first hinge pivotably coupling said first upper support beam to said upper end of said first side frame;

a first hinge stop coupled to said first upper support beam and engaging said upper end of said first side frame for positioning said first upper support beam in a general horizontal position for supporting the first object;

said first hinge positioning said first upper support beam in a general vertical position during vertical lifting of the first object from said lower object holding channel to said upper object holding channel;

a second hinge pivotably coupling said second upper support beam to said upper end of said second side frame;

a second hinge stop coupled to said second upper support beam and engaging said upper end of said second side frame for positioning said second upper support beam in a general horizontal position for supporting the first object; and said second hinge positioning said second upper support beam in a general vertical position during vertical lifting of the first object from said lower object holding channel to said upper object holding channel.

3. The object handling device as set forth in claim 2, further including a first guide arm coupled to said first upper support beam;

said first guide arm having a general vertical position when said first upper support beam is in said general horizontal position;

a second guide arm coupled to said second upper support beam;

said second guide arm having a general vertical position when said second upper support beam is in said general horizontal position; and said first guide arm and said second guide arm defining a guiding channel for guiding the first object in said upper object holding channel.

4. The object handling device as set forth in claim 2, wherein said first upper support beam includes a proximal end and a distal end;

a first beam cavity extending within said first upper support beam and to said distal end of said first upper support beam;

said first telescoping support beam slidably engaging within said first beam cavity;

said second upper support beam includes a proximal end and a distal end;

a second beam cavity extending within said second upper support beam and to said distal end of said second upper support beam; and said second telescoping support beam slidably engaging within said second beam cavity.

5. The object handling device as set forth in claim 4, further including a first beam track coupled to said first upper support beam and extending into said first beam cavity;

a first track block coupled to said first telescoping support beam and engaging within said first beam track for guiding said first telescoping support beam within said first beam cavity;

a second beam track coupled to said second upper support beam and extending into said second beam cavity; and a second track block coupled to said second telescoping support beam and engaging within said second beam track for guiding said second telescoping support beam within said second beam cavity.

6. The object handling device as set forth in claim 5, further including a first threaded aperture within said first track block;

a first threaded bar positioned within said first beam track and threadably engaging within said first threaded aperture;

a first rotational force coupled to said first threaded bar for rotating said first threaded bar and displacing said first track block relative to said first beam track and displacing said first telescoping support beam relative to said first upper support beam;

a second threaded aperture within said second track block;

a second threaded bar positioned within said second beam track and threadably engaging within said second threaded aperture; and a second rotational force coupled to said second threaded bar for rotating said second threaded bar and displacing said second track block relative to said second beam track and displacing said second telescoping support beam relative to said second upper support beam.

7. The object handling device as set forth in claim 6, further including a first plurality of wheels coupled to said first upper support beam and positioned within said first beam cavity;

said first plurality of wheels supporting said first telescoping support beam within said first beam cavity and rotating during displacement of said first telescoping support beam relative to said first upper support beam;

a second plurality of wheels coupled to said second upper support beam and positioned within said second beam cavity; and said second plurality of wheels supporting said second telescoping support beam within said second beam cavity and rotating during displacement of said second telescoping support beam relative to said second upper support beam.

8. The object handling device as set forth in claim 6, wherein said first rotational force includes a first electric motor coupled to said proximal end of said first upper support beam; and said second rotational force includes a second electric motor coupled to said proximal end of said second upper support beam.

9. The object handling device as set forth in claim 1, wherein said object lift includes a first scissor jack coupled between said lower support beam and the chassis; and a second scissor jack coupled between said lower support beam and the chassis.

10. A method for handling a first object and a second object on a vehicle, the vehicle having a chassis, the first object and the second object each having a first side, a second side, a front, a rear and a bottom, the method comprising the steps of:

lifting the first object from a lower object holding channel defining a lower support beam, a first side frame and a second side frame above the chassis;

positioning the first object in an upper object holding channel defining a first upper support beam and a second upper support beam;

pivoting said lower object holding channel, said upper object holding channel and the first object relative to the chassis;

positioning the second object into said lower object holding channel;

extending an angled object displacement channel defining a first telescoping support beam from said first upper support beam and a second telescoping support beam from said second upper support beam;

lowering the first object from said upper object holding channel and along said angled object displacement channel; and pivoting said lower object holding channel, said upper object holding channel and the second object relative to the chassis.

11. The method for handling a first object and a second object as set forth in claim 10, further including the steps of pivoting said first upper support beam in a generally vertical position during vertical lifting of the first object from said lower object holding channel to said upper object holding channel;

pivoting said second upper support beam in a generally vertical position during vertical lifting of the first object from said lower object holding channel to said upper object holding channel;

pivoting said first upper support beam in a generally horizontal position for supporting the first object; and pivoting said second upper support beam in a generally horizontal position for supporting the first object.

12. The method for handling a first object and a second object as set forth in claim 10, further including the steps of guiding the first object while in said upper object holding channel with a first guide arm and a second guide arm.

13. The method for handling a first object and a second object as set forth in claim 10, further including the steps of rotating a first threaded bar within said first upper support beam for displacing said first telescoping support beam; and rotating a second threaded bar within said second upper support beam for displacing said second telescoping support beam.

14. The method for handling a first object and a second object as set forth in claim 10, further including the steps of rolling said first telescoping support beam within said first upper support beam with a first plurality of wheels; and rolling said second telescoping support beam within said second upper support beam with a second plurality of wheels.

15. An object handling device coupled to a vehicle for handling a first object and a second object, the first object and the second object each having a first side, a second side, a front, a rear and a bottom, the vehicle having a chassis, the object handling device comprising:

a lower support beam coupled to the chassis for supporting the first object;

a first side fame coupled to said lower support beam and extending vertically from said lower support beam;

said first side frame defining a lower end, an upper end, a front end and a rear end;

a second side frame coupled to said lower support beam and extending vertically from the lower support bearer;

said second side frame defining a lower end, an upper end, a front end and a rear end;

said lower support beam, said first side frame and said second side frame defining a lower object holding channel;

a first upper support beam coupled to said upper end of said first side frame;

a second upper support beam coupled to said upper end of said second side frame;

said first upper support beam and said second upper support beam defining an upper object holding channel;

an object lift coupled to the chassis for vertically lifting the first object from said lower object holding channel to said upper object holding channel;

said first upper support beam and said second upper support beam supporting the first object in said upper object holding channel;

a pivot pivotably coupling said lower support beam to the chassis;

a beam lift coupled between said lower support beam and the chassis for pivoting said lower support beam and the first object relative to the chassis;

a lower hoist linking said lower support beam with the second object for positioning the second object within said lower object holding channel;

a first telescoping support beam extending from said first upper support beam;

a second telescoping support beam extending from second upper support beam;

said first telescoping support beam and said second telescoping support beam defining an angled Object displacement channel; and an upper hoist linking with the first object for displacing the first object along said angled object displacement channel.

* * * * *